United States Patent
Mercea et al.

(10) Patent No.: US 9,013,455 B2
(45) Date of Patent: Apr. 21, 2015

(54) RECHARGEABLE ACTIVE PEN AND ELECTRONIC DEVICE WITH CORRESPONDING CHARGING DOCK

(71) Applicant: Research In Motion Limited, Waterloo (CA)

(72) Inventors: Cornel Mercea, Waterloo (CA); Yu Gao, Waterloo (CA); Amit Pal Singh, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 123 days.

(21) Appl. No.: 13/622,053

(22) Filed: Sep. 18, 2012

(65) Prior Publication Data
US 2014/0078116 A1 Mar. 20, 2014

(51) Int. Cl.
*G06F 3/033* (2013.01)
*G06F 1/26* (2006.01)
*G06F 3/0354* (2013.01)

(52) U.S. Cl.
CPC ............ *G06F 1/266* (2013.01); *G06F 3/03545* (2013.01); *G06F 2200/1632* (2013.01)

(58) Field of Classification Search
CPC ........................................................ G06F 1/266
USPC ................... 178/18.01–20.04; 345/173–179
See application file for complete search history.

(56) References Cited

U.S. PATENT DOCUMENTS

| | | | |
|---|---|---|---|
| 4,563,728 A | | 1/1986 | Bruggeman et al. |
| 4,716,354 A | * | 12/1987 | Hacker .......................... 320/114 |
| 5,384,688 A | * | 1/1995 | Rockwell ...................... 361/736 |
| 5,473,464 A | * | 12/1995 | Knowles et al. ............... 359/237 |
| 5,663,828 A | | 9/1997 | Knowles |
| 5,973,677 A | * | 10/1999 | Gibbons ....................... 345/179 |
| 6,249,276 B1 | | 6/2001 | Ohno |

(Continued)

FOREIGN PATENT DOCUMENTS

| | | |
|---|---|---|
| DE | 29612752 | 9/1996 |
| EP | 2428874 | 3/2012 |
| WO | 03036673 | 5/2003 |

OTHER PUBLICATIONS iProcedures Data Security http://iproceduresllc.com/how-it-works/data-security/, retrieved online May 23, 2012.

(Continued)

*Primary Examiner* — Alexander S Beck
*Assistant Examiner* — Charles Zheng
(74) *Attorney, Agent, or Firm* — Integral Intellectual Property Inc.; Miriam Paton; Amy Scouten

(57) ABSTRACT

Powered by a battery module, an active pen may transmit a signal that is intended for detection by a touch screen. The active pen may comprise an elongated clip member connected to an elongated body member, the free end of the clip member having a ground contact, and the body member having control and charging contacts opposite the ground contact. The free end may be biased such that the ground contact is normally in contact with the control and charging contacts, thereby maintaining the active pen in a signal-transmitting state until separation of the contacts. An electronic device may charge the battery module, optionally responsive to authorization thereof. The electronic device may comprise a partition member to separate the free end of the clip member from the body member, the partition member having contacts corresponding to those of the active pen for enabling charging of the battery module.

9 Claims, 10 Drawing Sheets

(56) References Cited

U.S. PATENT DOCUMENTS

| | | | |
|---|---|---|---|
| 6,344,848 B1* | 2/2002 | Rowe et al. | 345/179 |
| 6,437,543 B1 | 8/2002 | Oler et al. | |
| 6,628,271 B1* | 9/2003 | Matsumoto et al. | 345/179 |
| 7,046,237 B1* | 5/2006 | Nicolas et al. | 345/179 |
| 8,373,683 B2* | 2/2013 | Katsurahira et al. | 345/179 |
| 2002/0169001 A1 | 11/2002 | Itazawa | |
| 2006/0192772 A1 | 8/2006 | Kambayashi | |
| 2008/0174571 A1 | 7/2008 | Chen | |
| 2008/0265838 A1 | 10/2008 | Garg et al. | |
| 2009/0009143 A1* | 1/2009 | Odaohhara | 320/162 |
| 2010/0327812 A1* | 12/2010 | Hsieh | 320/134 |
| 2011/0016333 A1 | 1/2011 | Scott | |
| 2012/0133327 A1 | 5/2012 | Lee | |

OTHER PUBLICATIONS

White Paper: Nokia Digital Pen http://www.yumpu.com/document/view/392872/white-paper-nokia-digital-pen Oct. 1, 2003.

Aryeh, Dima, Samsung Galaxy SIII Accessories Shown Off to Camera http://www.droiddog.com/android-blog/2012/05/samsung-galaxy-siii-accessories-shown-off-to-camera/ May 14, 2012.

Vertua, Arturo, Extended European Search Report for EP 12184907.9, Sep. 18, 2013.

Vertua, Arturo, Partial Search Report for EP 12184907.9, May 10, 2013.

Popa, Cristian, First Office Action for CA2819935, Aug. 22, 2014.

* cited by examiner

RECHARGEABLE ACTIVE PEN AND ELECTRONIC DEVICE WITH CORRESPONDING CHARGING DOCK

TECHNICAL FIELD

This disclosure describes a rechargeable active pen and an associated electronic device configurable to recharge the active pen.

BACKGROUND

Many electronic devices permit users to input and manipulate data via the same display screen used to view output from the electronic device. This type of screen is commonly known as a touch screen because it is configured to detect the presence and location of a touch within the display area, such as a touch from a user's finger or from the tip of a stylus or pen. In one example, a touch screen may include resistive digitizer technology, which senses the position of a force that is applied to the surface of screen. Resistive touch screens can detect a fingertip as well as a stylus or pen. In another example, a touch screen may include capacitive digitizer technology, which senses the position of a distortion of the screen's electrostatic field, which results from a conductor, such as a fingertip, contacting the surface of the screen. Unlike resistive touch screens, capacitive touch screens cannot be used through most types of electrically insulating material, such as gloves. A capacitive touch screen may be used with a stylus, provided that it is a stylus having suitable conductive properties.

The term "touch screen" is also commonly used to refer to types of screens that do not necessarily require touch to operate. Such screens may employ active digitizer technology, which is able to detect a signal transmitted by a special type of stylus or pen, such as a pen that transmits a radiofrequency (RF) signal, an ultrasonic signal, an electromagnetic signal, or an infrared signal. For example, touch screen employing active digitizer technology may be configured to detect the presence and position of a signal-transmitting pen that is hovering above the surface of the touch screen, but not actually in physical contact with the touch screen.

This type of signal-transmitting pen, also known as an active pen, requires a power supply for generating and transmitting a signal that is detectable by the associated touch screen. In one example, an active pen may receive power directly, via a tethered cable, from the electronic device that comprises the touch screen. However, a tether between the active pen and the electronic device may be ergonomically inhibitive for the user, and may prevent use of the active pen with other touch screens.

In another example, an active pen may receive power from one or more internal batteries. These batteries will either need to be replaced or recharged from time to time.

BRIEF DESCRIPTION OF THE DRAWINGS

FIG. 1-2 is a schematic diagram of the example active pen of FIG. 1-1 in a deactivated state;

FIG. 2 is a flow chart illustrating an example method to be performed by an active pen for activating and deactivating the active pen;

FIG. 3-1 is a schematic diagram of an example active pen together with an example electronic device configurable to recharge the active pen;

FIG. 3-2 is a schematic diagram showing modified versions of the example active pen and the example electronic device of FIG. 3-1;

DETAILED DESCRIPTION

Figure 1:
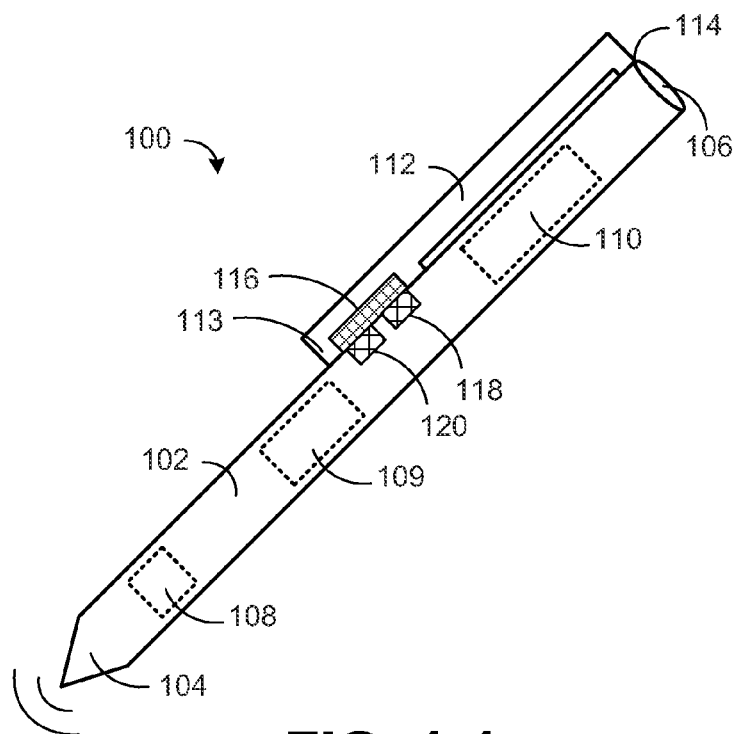
FIG. 1-1 is a schematic diagram of an example active pen in an active state.

Traditionally, an active pen may continuously transmit a signal, even when not in use, thereby resulting in unnecessary battery drainage. Thus, the ability to selectively deactivate signal transmission by the active pen may be of interest. However, a user may also prefer that the active pen is normally in an active, transmitting state, such that no extra effort is required to make use of the active pen. For example, it might be cumbersome for a user to have to depress a button continuously in order to maintain the active pen in an active state.

According to a broad aspect, there is disclosed an active pen comprising an elongated body member containing therein a signal transmission module and a battery module, the signal transmission module configurable to transmit a signal that is intended for detection by a touch screen comprising associated active digitizer technology and the battery module comprising one or more batteries configurable to power the signal transmission module. The active pen further comprises an elongated clip member connected to the body member, the clip member having a free end comprising a ground contact that is connected to a reference voltage of the active pen. The ground contact is positioned on a body-facing surface of the free end of the clip member at a position opposite a control contact and a charging contact positioned on a clip-facing surface of the body member. The free end of the clip member is biased toward the clip-facing surface of the body member such that the ground contact is normally in electrically conductive contact with the control contact and the charging contact. The battery module is configured to provide power to the signal transmission module responsive to the ground contact being in electrically conductive contact with the control contact and the charging contact, and the battery module is configured to deny or to limit full power to the signal transmission module responsive the ground contact being separated from one or both of the control contact and the charging contact. As used herein, providing power or voltage or other quantity generally includes supplying, furnishing, making available or controlling the supply of the quantity. Denying generally refers to the obstructions of providing, and includes substantially limiting the providing. For purposes of illustration, denying full power includes obstruction of the provision of some or all power.

According to another broad aspect, there is disclosed an active pen comprising a signal transmission module and a battery module. The signal transmission module is configurable to transmit a signal that is intended for detection by a touch screen of an electronic device. The battery module comprises one or more batteries configurable to provide power to the signal transmission module. The active pen further comprises a ground contact that is connected to a reference voltage of the active pen, as well as a control contact, and a charging contact. The active pen comprises an authorization module operative to receive a challenge from an electronic device via the control contact, to determine a response to the challenge, and to communicate the response to the electronic device via the control contact for a purpose of authorizing the active pen to receive a charging voltage from the electronic device via the charging contact.

According to another broad aspect, there is disclosed an electronic device comprising a charging module and a partition member, where the partition member has a first surface that is coincident with an external surface of the electronic device and a second opposing surface that is coincident with an internal surface of a cavity within a body of the electronic device. The partition member is configured to separate a free end of a clip member of an active pen from a clip-facing surface of a body member of the active pen. The cavity is configured to receive at least the free end of the clip member. The first surface of the partition member comprises a control contact and a charging contact configurable to be in electrically conductive contact with a corresponding control contact and charging contact on the clip-facing surface of the body member of the active pen. The second surface of the partition member comprises a ground contact connected to a reference voltage. The ground contact is configurable to be in electrically conductive contact with a corresponding ground contact on a body-facing surface of the free end of the clip member of the active pen, where the clip member is normally in contact with the control contact and the charging contact on the clip-facing surface of the body member of the active pen. The charging module is configurable to provide, via the charging contact of the electronic device, a charging voltage to the active pen for charging a battery module of the active pen.

According to another broad aspect, there is disclosed an electronic device comprising a charging module, a ground contact, a control contact, and a charging contact. The ground contact is connected to a reference voltage and configurable to be in electrically conductive contact with a corresponding ground contact of an active pen. The control contact is configurable to be in electrically conductive contact with a corresponding control contact of the active pen. The charging contact is configurable to be in electrically conductive contact with a corresponding charging contact of the active pen. The electronic device is configured to communicate a challenge to the active pen via the control contact and to receive a response from the active pen via the control contact. The electronic device is also configured to enable the charging module to provide a charging voltage to the active pen via the charging contact, responsive to determining that the received response is a correct response to the challenge. The electronic device is further configured to disable the charging module from providing the charging voltage to the active pen via the charging contact, responsive to determining that the received response is not a correct response to the challenge.

According to another broad aspect, there is disclosed a method to be performed by an active pen, the method comprising receiving a challenge from an electronic device via a control contact of the active pen, determining a response to the challenge, and communicating the response to the electronic device via the control contact for a purpose of authorizing the active pen to receive a charging voltage from the electronic device via a charging contact of the active pen, where the charging voltage is to charge one or more batteries of a battery module of the active. The one or more batteries are configurable to provide power to a signal transmission module of the active pen, which is configurable to transmit a signal that is intended for detection by a touch screen employing active digitizer technology.

According to another broad aspect, there is disclosed a method to be performed by an electronic device, the method comprising communicating, via a control contact of the electronic device, a challenge to an active pen via a corresponding control contact of the active pen, and receiving, via the control contact of the electronic device, a response from the active pen via the corresponding control contact. The method also comprises enabling a charging module of the electronic device to provide a charging voltage to the active pen via the charging contact, responsive to determining that the received response is a correct response to the challenge. The method further comprises disabling the charging module from providing the charging voltage to the active pen via the charging contact, responsive to determining that the received response is not a correct response to the challenge.

FIG. 1-1 is a schematic diagram of an example active pen 100 in an active state.

The active pen 100 comprises an elongated body member 102 that includes a tip 104 and a rear end 106. The body member 102 comprises a signal transmission module 108 and a power supply or battery module 110.

The signal transmission module 108 is configurable to transmit a signal that is intended for detection by an associated touch screen of an electronic device comprising active digitizer technology. For example, the signal may be detectable by an associated touch screen of an electronic device when the tip 104 of the active pen 100 is proximal to the touch screen, or the active pen 100 is in specified orientation relative to the touch screen, or both. For example, the signal transmission module 108 may comprise a signal generator, as well as other components configurable to direct the signal along an output path that passes through the tip 104. The signal transmission module 108 may transmit, for example, an RF signal, an ultrasonic signal, an electromagnetic signal, or an infrared signal.

The battery module 110 may comprise one or more batteries and is configurable to provide power to the signal transmission module 108. The one or more batteries may be single-use batteries or rechargeable batteries. For example, the batteries may be lithium ion (LiIon) batteries or nickel-metal hydride (NiMH) batteries.

The body member 102 may comprise additional circuitry 109, which will be described further with respect to FIG. 8. The additional circuitry 109 may comprise one or more switching modules (not shown). In one example, a switching module may be configurable to control the delivery of power from the battery module 110 to the signal transmission module 108. In another example, in the case that the battery module 110 comprises rechargeable batteries, a switching module may be configurable to control the delivery of power from an external power source to the battery module 110 for charging the batteries. The additional circuitry 109 may further comprise a temperature sensor module (not shown) and, optionally, an authorization module (not shown). These features will be described further with respect to FIGS. 3-1, 3-2, 4, 6 and 8.

In addition to the body member 102, the active pen 100 comprises an elongated clip member 112, which may be permanently or removably attached to the body member 102 via at least one connection 114. The connection 114 may be located proximal the rear end 106 of the body member 102, such that the clip member 112 comprises a free end 113 that is not connected to the body member 102. In one example, the clip member 112 may comprise a threaded cap (not shown) and the connection 114 may be formed by screwing the threaded cap onto corresponding threads (not shown) encircling the rear end 106 of the body member 102. In another example, the connection 114 between the clip member 112 and the body member 102 may comprise a hinge (not shown), such that the clip member 112 is able to be rotated away from the body member 102 about the hinge.

In normal operating conditions, the longitudinal axes of the clip member 112 and the body member 102 are substantially parallel and the free end 113 of the clip member 112 is biased such that it is in contact with an exterior surface of the body member 102, as shown in FIG. 1-1.

The portion of the free end 113 that is normally in contact with the exterior surface of the body member 102 comprises an electrically conductive contact 116, which is internally connected to a reference voltage of the active pen 100, also known as a ground voltage. For this reason, contact 116 will herein be referred to as the "ground contact" of the active pen 100. The ground contact 116 is located on a body-facing surface of the clip member 112.

The portion of the exterior surface of the body member 102 that is normally in contact with the free end 113 of the clip member 112 will herein be referred to as the clip-facing surface, and comprises electrically conductive contacts 118 and 120. For reasons which will become clear later, these contacts will be referred to as the "control contact" and the "charging contact", respectively.

The control contact 118 and the charging contact 120 are illustrated as being spaced apart along the length of the body member 102, with the control contact 118 being closer to the tip 104, and the charging contact being closer to the rear end 106. However, other spatial configurations may be used, provided that both the control contact 118 and the charging contact 120 are in electrically conductive contact with the ground contact 116 of the clip 112 during normal operating conditions (that is, when the free end 113 of the clip member 112 is in contact with the clip-facing surface of the body member 102).

For clarity, the contacts 116 and 118 are shown in FIG. 1-1 as being only partially concealed by the body-facing surface of the clip member 112. Similarly, the contact 120 is shown as being only partially concealed by the clip-facing surface of the body member 102. However, in reality, the contacts 116, 118 and 120 may be positioned such that, during normal operating conditions, all of the contacts 116, 118 and 120 are concealed or hidden, thereby substantially limiting or preventing their exposure to external objects. That is, the free end 113 of the clip member 112 may be positioned such that the body-facing surface limits or prevents exposure of the control contact 118 and the charging contact 120 to external objects. Similarly, the clip-facing surface of the body member 102 may limit or prevent the ground contact 116 from being exposed to external objects. By limiting or preventing the exposure of the contacts 116, 118 and 120, for example, to the user's fingers, the risk of electro-static discharge (ESD) may be significantly reduced.

In one example, the contacts 116, 118 and 120 are standard copper contacts laminated in gold, however other materials suitable for electrical contacts may be used.

While the ground contact 116 is in electrically conductive contact with the control contact 118 and with the charging contact 120, the circuitry 109 may be configured to supply power from the battery module 110 to the signal transmission module 108 so that the active pen 100 is configured to transmit a signal. In these circumstances, the active pen 100 may be considered to be in an active state.

Figures 1, 2:
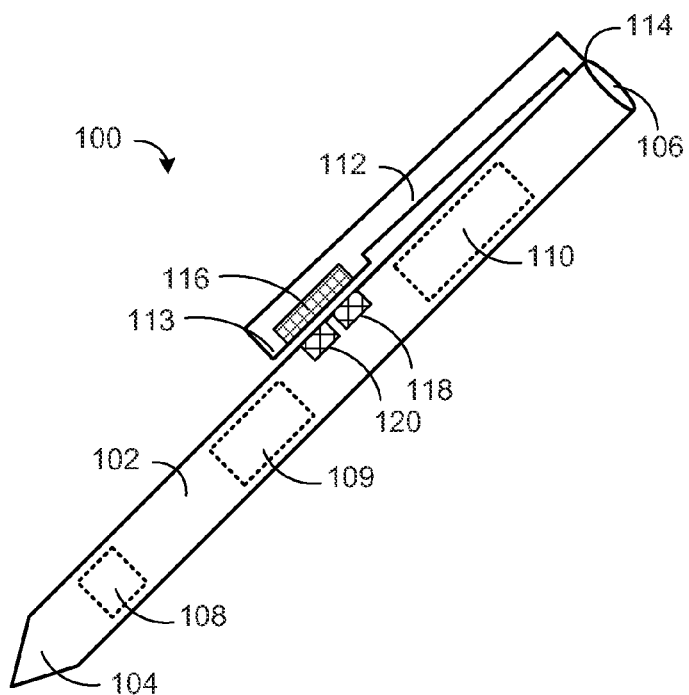
Figure 2:
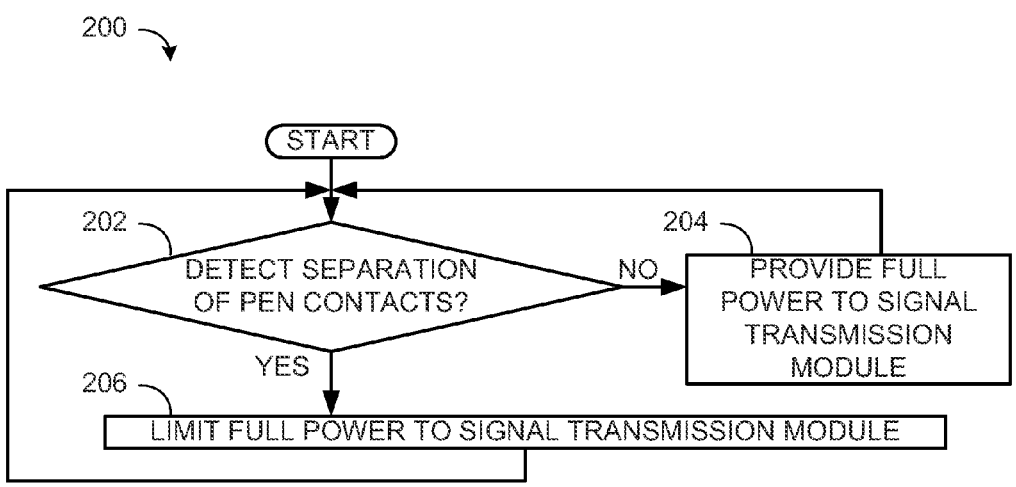

In contrast, while the ground contact 116 is not in electrically conductive contact with one or both of the control contact 118 and the charging contact 120, the circuitry 109 may be configured to limit or to deny power from the battery module 110 to the signal transmission module 108 so that the active pen 100 is not configured to transmit a signal. In these circumstances, the active pen 100 may be considered to be in a deactivated state, as illustrated in FIG. 1-2. This may occur, for example, when the clip member 112 is separated from the body member 102 by a piece of clothing, as a result of the active pen 100 being clipped in a pocket.

In the example of FIG. 1-2, the clip member 112 comprises a flexible material such that it is able to be flexed away from the body member 102, thereby creating a separation between the ground contact 116 and one or both of the control contact 118 and the charging contact 120. Alternatively, in the case that the connection 114 is formed by screwing a threaded cap of the clip member 112 onto corresponding threads encircling the rear end 106 of the body member 102, the ground contact 118 may be separated from one or both of the control contact 118 and the charging contact 120 by a partial unscrewing of the threaded cap. In another example, in the case that the connection 114 comprises a hinge, the ground contact 118 may be separated from one or both of the control contact 118 and the charging contact 120 by rotating the clip member 112 away from the body member 102 about the hinge.

In yet another example, the clip member 112 may be stationary relative to the body member 102, and one or more of the contacts 116, 118 and 120 may be movable. For example, the control contact 118 and the charging contact 120 may be elastic or spring-loaded, such that they are normally in contact with the ground contact 116, but may be forced inward toward the body member 102, thereby placing the active pen 100 in the deactivated state.

Although the clip member 112 is illustrated in FIGS. 1-1 and 1-2 as a substantially rectangular box, other shapes may be suitable. For example, the clip member 112 may be concave or arcade in shape. Some shapes may be mechanically stronger than others.

Furthermore, although the clip member 112 is illustrated in FIGS. 1-1 and 1-2 as being attached to the body member via the single connection 114, the clip member 112 may be attached to the body member 102 via multiple connections. For example the clip member 112 may be attached via multiple pillars.

The active pen 100 may comprise additional components which, for clarity, are not illustrated in FIGS. 1-1 and 1-2. For example, the active pen 100 may comprise one or more buttons configurable to control the operation of the active 100. The active pen 100 may also comprise a pressure sensor configurable to detect pressure applied at the tip 104.

FIG. 2 is a flow chart illustrating an example method 200 to be performed by an active pen, such as the active pen 100, for activating and deactivating the active pen.

At 202, the active pen 100 checks whether it has detected a separation of the ground contact 116 from one or both of the control contact 118 and the charging contact 120. The active pen 100 may check for this separation periodically, according to a timer. For example, the active pen 100 may check for detection of a separation every 1 to 3 seconds. Examples of how this separation may be detected are described with respect to FIG. 8.

Responsive to the active pen 100 determining at 202 that it has not detected a separation of the ground contact 116 from one or both of the control contact 118 and the charging contact 120, the active pen 100 may continue to provide full power from the battery module 110 to the signal transmission module 108 at 204, such that the active pen 100 is configured to transmit a signal that is intended for detection by an associated touch screen. For example, the signal may be detectable by an associated touch screen when the active pen 100 is within a sufficient proximity to the touch screen, or the active pen 100 is in a particular orientation relative to the touch screen, or both. The active pen 100 may then continue to check for separation of the pen contacts at 202. Thus, as long as the active pen 100 does not detect a separation of the ground contact 116 from one or both of the control contact 118 and the charging contact 120, the active pen 100 remains in an active state.

Responsive to the active pen 100 determining at 202 that it has detected a separation of the ground contact 116 from one or both of the control contact 118 and the charging contact 120, the active pen 100 may limit or deny full power from the battery module 110 to the signal transmission module 108 at 206, such that the active pen 100 is not configured to transmit a signal that is intended for detection by an associated touch screen. The active pen 100 may then continue to check for separation of the pen contacts at 202. Thus, as long as the active pen 100 continues to detect a separation of the ground contact 116 from one or both of the control contact 118 and the charging contact 120, the active pen 100 remains in a deactivated state.

Following the limiting of full power to the signal transmission module, as shown at 206, the active pen 100 may subsequently determine at 202 that it no longer detects a separation of the pen contacts. In this case, the active pen 100 may proceed to provide full power to the signal transmission module 108, as shown at 204. Although not explicitly shown, the active pen 100 may await some additional event prior to providing full power to the signal transmission module 108. For example, even after determining that the active pen 100 no longer detects a separation of the pen contacts at 202, the active pen 100 may only provide full power to the signal transmission module 108 responsive to a button of the active pen 100 being pressed, or to a tip of the active pen 100 being tapped on a touch screen. In the latter example, the tip of the active pen 100 may comprise a force-sensing mechanism configurable to sense a force against the tip.

Although the active pen 100 has thus far been described as performing a single action at 202, that is, checking for separation of the pen contacts, the active pen 100 may perform different checking actions depending on whether it is currently in an active state or a deactivated state. For example, when the active pen 100 is currently in a deactivated state, the active pen 100 may check for contact between the ground contact 116 and one or both of the control contact 118 and the charging contact 120. The checking for contact (when in a deactivated state) may occur at the same rate or more often than the checking for separation (when in an activated state). For example, the checking for contact may be treated as an interrupt event and may be detectable in less than 500 us, whereas the checking for separation may be performed less often, such as every 1 minute. Checking for separation less often may prevent the active pen 100 from becoming deactivated immediately upon separation of the clip member 112 from the body member 102, which might be a result of an unintentional gesture performed by the user.

The one or more batteries of the battery module 110 of the active pen 100 may be rechargeable. Instead of removing these batteries for recharging, the active pen 100 may be configurable to recharge the batteries of the battery module 110 using power received from another electronic device via the charging contact 120. Indeed, the one or more batteries of the battery module 110 may be non-removable from the active pen 100. This proposed technology is described further with respect to FIGS. 3-1 to 7.

Figures 1, 3:
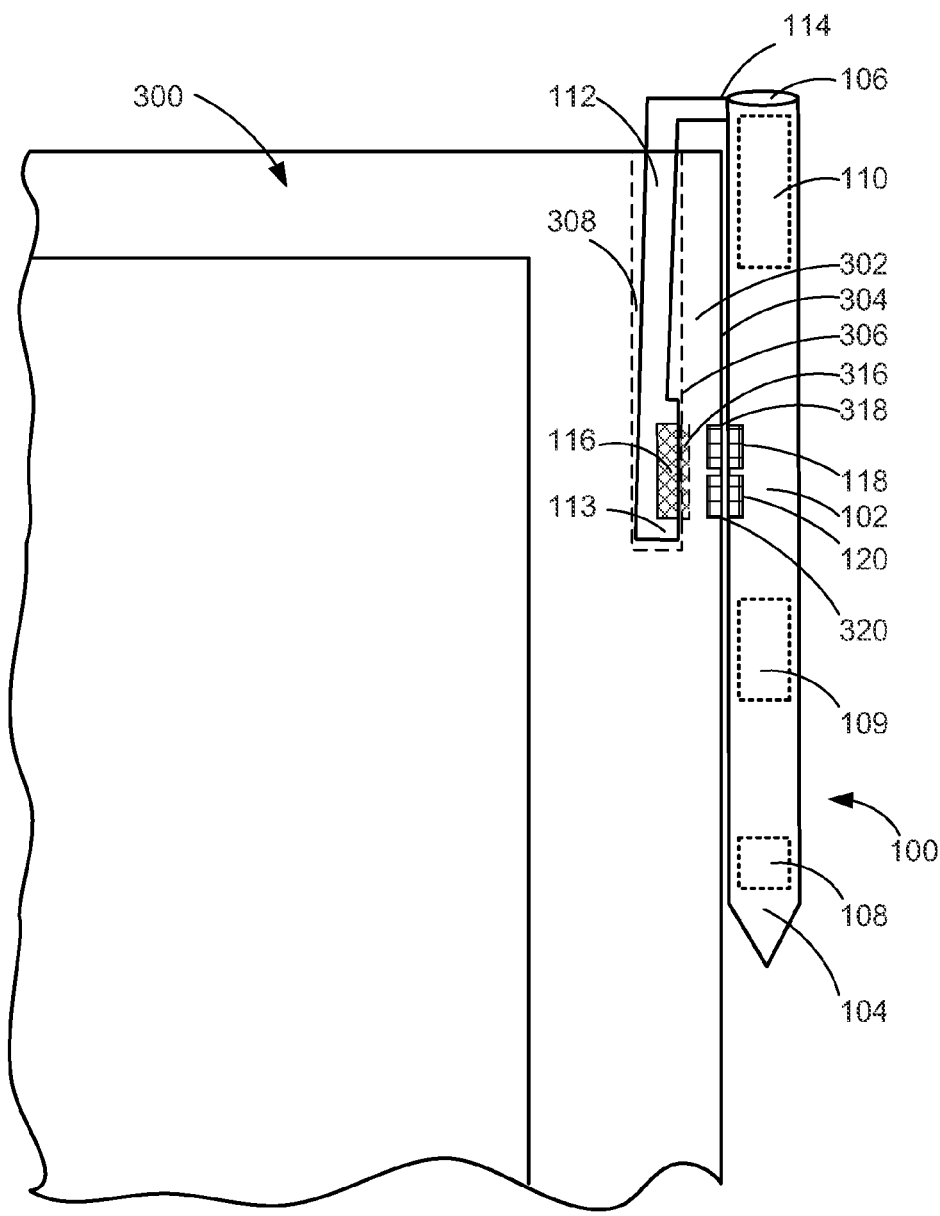
Figures 2, 3:
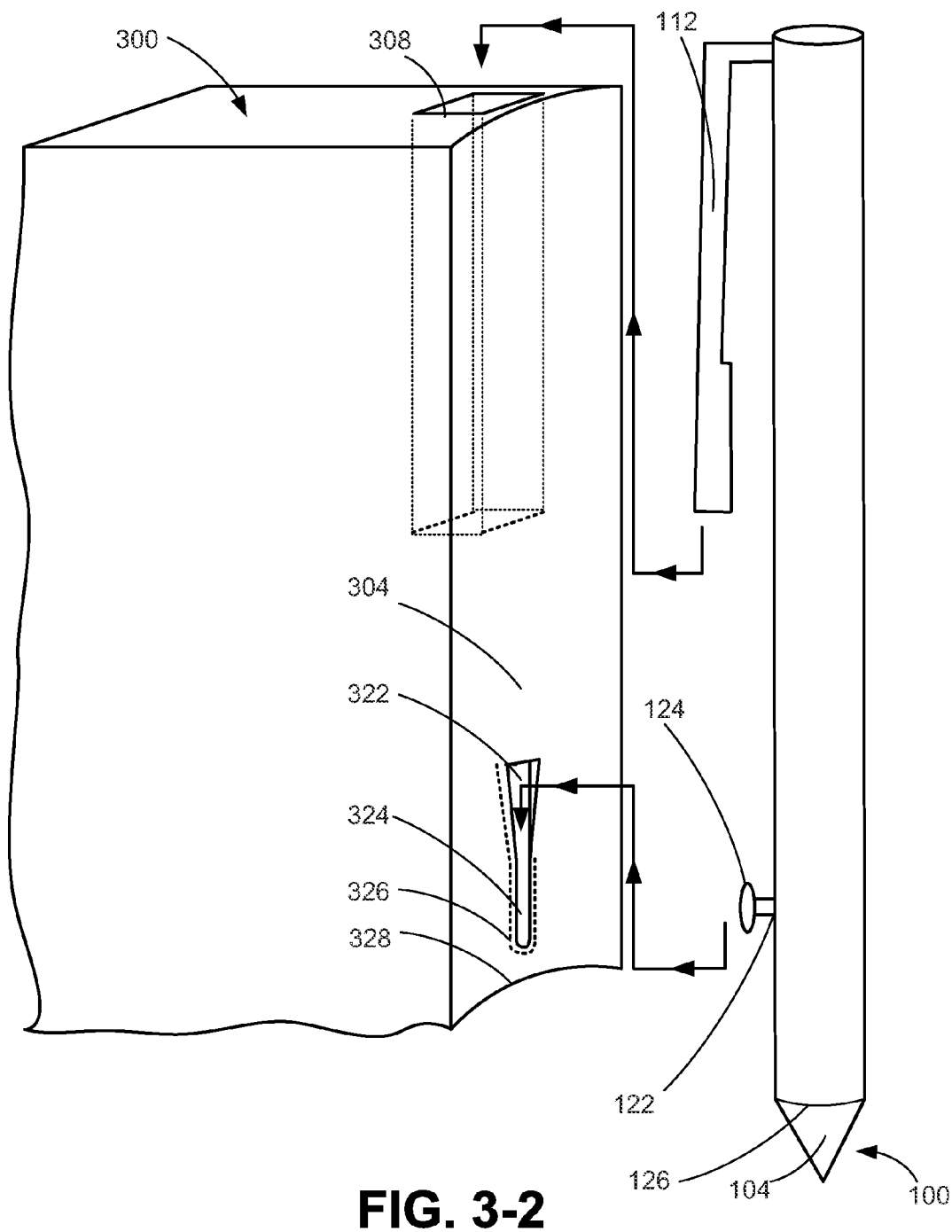

FIG. 3-1 illustrates the active pen 100 together with an example electronic device 300 that is configurable to recharge the active pen 100.

The electronic device 300 may be a portable electronic device, such as a mobile telephone, a PDA, or a tablet computer, and may comprise additional components which, for clarity, are not illustrated in FIG. 3-1. The electronic device 300 may be configurable to convert a voltage from an internal power source to a voltage suitable to charge the active pen 100. For example, where the electronic device 300 is a tablet computer that is powered by a 3.6 Volt battery (such as a LiIon battery), and the active pen 100 is powered by a 1.2 Volt battery, the electronic device 300 may be configurable to convert 3.6 Volts to 1.2 Volts for charging the active pen 100.

Alternatively, the electronic device 300 may be purely a charging device that is configured to convert a voltage from a wall outlet to a voltage suitable to charge the active pen 100.

The electronic device 300 comprises a partition member 302 having a first surface 304 that is coincident with an external surface of the electronic device 300 and a second opposing surface 306 that is coincident with an internal surface of a cavity 308 within a body of the electronic device 300. The partition member 302 is configured to separate the body-facing surface of the free end 113 of the clip member 112 of the active pen 100 from the clip-facing surface of the body member 102 of the active pen 100. The cavity 308 is configured to receive at least the free end 113 of the clip member 112, and optionally some or all of the remainder of the clip member 112.

The first surface 304 comprises a control contact 318 and a charging contact 320. The second surface 306 comprises a ground contact 316 that is connected to a ground voltage of the electronic device 300. The contacts 316, 318 and 320 are positioned in the electronic device 300 such that, when the free end 113 of the clip member 112 of the active pen 100 is inserted into the cavity 308, the contacts 316, 318 and 320 are in electrically conductive contact with the corresponding contacts 116, 118 and 120. That is, the ground contact 316 of the electronic device 300 is configurable to be in electrically conductive contact with ground contact 116 on the body-facing surface of the free end 113 of the clip member 112, the control contact 318 is configurable to be in electrically conductive contact with the control contact 118 on the clip-facing surface of the body member 102 of the active pen 100, and the charging contact 320 is configurable to be in electrically conductive contact with the charging contact 120 on the clip-facing surface of the body member 102 of the active pen 100.

The force of the charging contact 120 against the charging contact 320 during charging may be strong enough to limit energy loss and heat generation. Since the current drawn may be significant, energy loss and heat generation may appear when the electrical contact force is not sufficient to maintain the electrical contact resistance below a certain level. The current drawn could be significant. For example, with a current of I=0.1 A, and a contact resistance of $R_{contact}=0.01\Omega$, the power loss would be $P=I^2*R_{contact}=0.1$ mW. In another example, with a current of I=0.1 A, and a contact resistance of $R_{contact}=1\Omega$, the power loss would be $P=I^2*R_{contact}=10$ mW.

Together, the partition member 302, the ground contact 316, the control contact 318 and the charging contact 320 may be referred to as a "charging dock" for the active pen 100.

Since the cavity 308 need only receive the clip member 112 of the active pen 100, and not the body member 102 of the active pen 100, the dimensions of the cavity 308 may be minimized so as to limit the volume that is taken up by the cavity 308 within the body of the electronic device 300.

The electronic device 300 may be configurable to provide or to deny a charging voltage to the active pen 100 via the charging contact 320 when the active pen 100 is placed in the charging dock. The active pen 100 may be configurable to provide or to deny a charging voltage received from the electronic device 300 via the charging contact 120 to the battery module 110 for charging one or more batteries therein.

In some examples, one or more additional portions of the active pen 100 may be received by corresponding portions of the electronic device 300. These additional points of connection between the active pen 100 and the electronic device 300 may result in a more reliable and mechanically secure connection when the active pen 100 is present in the charging dock.

FIG. 3-2 illustrates an example modified version of the active pen 100, which comprises a reinforcement pin 122 extending from a surface of the active pen 100 such that it is aligned with the clip member 112. The reinforcement pin 122 has a button member 124 extending therefrom, where the diameter of the button member 124 is larger than a diameter of the reinforcement pin 122, as shown in FIG. 3-2. In one example, the reinforcement pin 122 is substantially cylindrical in shaped, and the button member 124 is substantially disk-like in shape. However, other configurations may be used.

In the example of FIG. 3-2, the electronic device 300 of FIG. 3-1 is modified to include a guiding tunnel 322 and a sliding chamber 324, both of which extend along the first surface 304. The guiding tunnel 322 is closer than the sliding chamber 324 to the end of the electronic device 300 that comprises the opening to the cavity 308, and the guiding tunnel 322 is connected to the sliding chamber 324. The guiding tunnel 322 is configurable to removably receive the reinforcement pin 122 and the button member 124 of the active pen 100 as the clip member 112 of the active pen 100 is being inserted into the cavity 308. The width of the guiding tunnel 322 may become narrower in the proximity of sliding chamber 324. In one example, the shape of the guiding tunnel 322 along the surface 304 is trapezoidal, however, other configurations for the guiding tunnel 322 may be used. As the active pen 100 slides downward and the clip member 112 is inserted further into the cavity 308, the guiding tunnel 322 guides the reinforcement pin 122 and the button member 124 toward the start of the sliding chamber 324. The width of the sliding chamber 324 at its opening along the first surface 304 is smaller than the width of the sliding chamber 324 below the first surface 304, thereby creating a lip 326. The diameter of the reinforcement pin 122 is smaller than the width of the sliding chamber 324 at its opening along the first surface 304, while the diameter of the button member 124 is larger than the width of the sliding chamber 324 at its opening along the first surface 304. Thus, once the reinforcement pin 122 and the button member 124 have entered the sliding chamber 324, the lip 326 prevents the active pen 100 from being pulled away from the electronic device 300 in a direction perpendicular to the first surface 304. This is by virtue of the larger diameter of the button member 124 relative to the width of the sliding chamber 324 at its opening along the first surface 304. Thus, in addition to the active pen 100 being secured to the electronic device 300 via the insertion of the clip member 112 into the cavity 308, the active pen 100 is also secured via the insertion of the reinforcement pin 122 and the button member 124 into the sliding chamber 324.

Although not explicitly illustrated, the reinforcement pin 122 or the button member 124 or both may comprise additional functionality beyond their roles in securing the active pen 100 in the charging dock of the electronic device 300. Similarly, the electronic device 300 may comprise additional functionality related to sliding chamber 322 or the lip 324 or both. For example, the reinforcement pin 122 or the button member 124 may comprise an electrical contact (not shown), and the sliding chamber 322 or the lip 324 may comprise a corresponding electrical contact (not shown), such that the electrical contacts are configurable to be in electrically conductive contact when the when the reinforcement pin 122 and the button member 124 are inserted into the sliding chamber 322. This pair of contacts (not shown) may be used to achieve any of the functionalities of the ground contacts 116 and 316, or the control contacts 118 and 318, or the charging contacts 120 and 320, as described with respect to FIG. 3-1. Alternatively, this pair of contacts (not shown) may be used to achieve other functionalities, such as the communication of other information between the active pen 100 and the electronic device 300. The button member 124 may also be used to control operation of the active pen 100. For example, the button member 124 may be configured as a mechanical switch that connects to an electrical switch within the active pen 100.

As illustrated in FIG. 3-2, the first surface 304 may comprise a concave curvature 328 that complements a corresponding convex curvature 126 of the body member 102 of the active pen 100. The first surface 304 may also comprise a curvature (not shown) that complements the curvature of the tip 104 of the active pen 100. The complementary curvatures of the first surface 304 of the electronic device 300 and the body member 102 of the active pen 100 may result in a more seamless and elegant integration of the active pen 100 with the electronic device 300 when the active pen 100 is docked.

The physical configurations of the active pen 100 and the electronic device 300 as illustrated in FIGS. 3-1 and 3-2 are merely examples. Other configurations may result in a more ergonomic integration of the active pen 100 with the electronic device 300.

Figure 4:
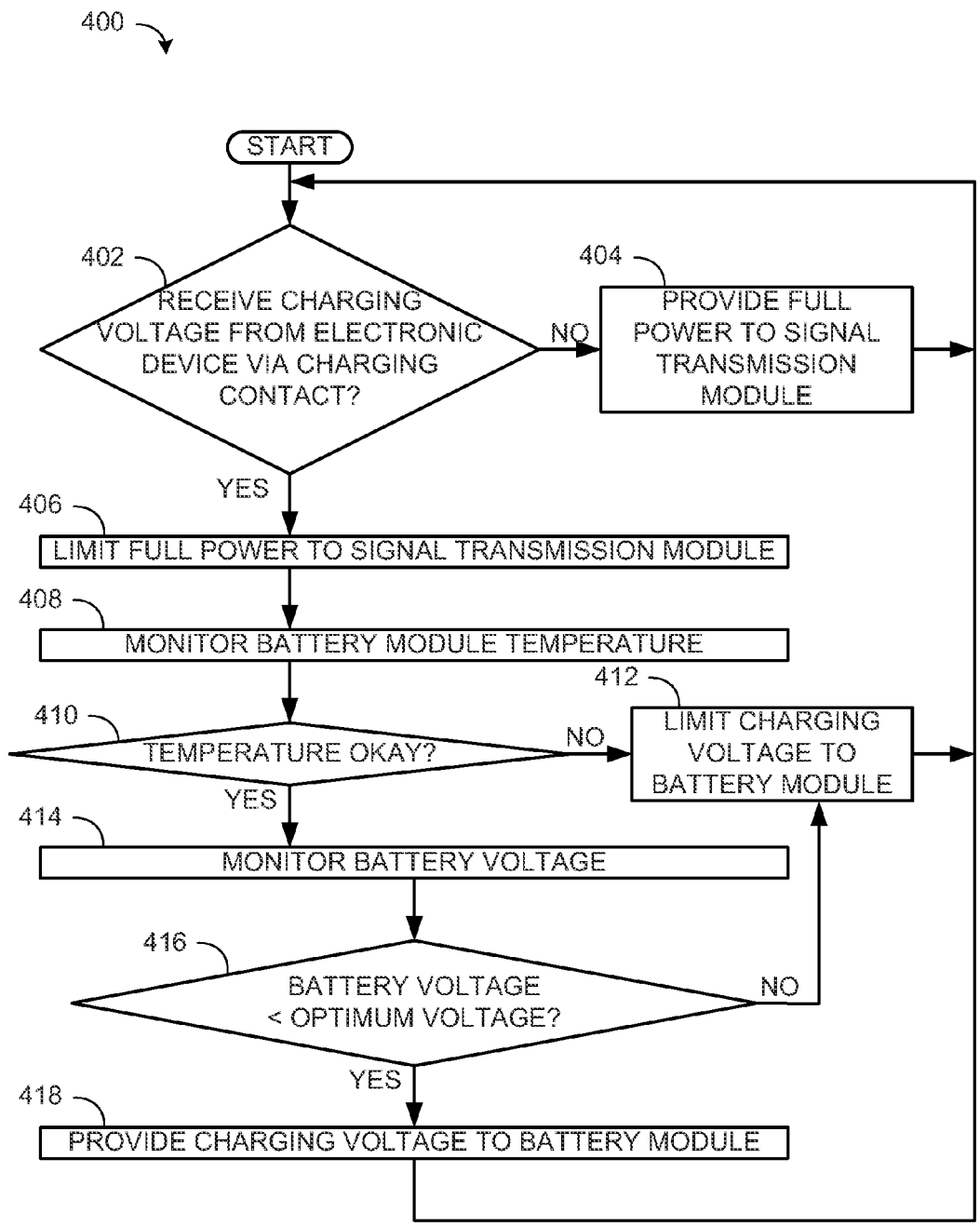
FIG. 4 is a flow chart illustrating a first example method to be performed by an active pen for being charged by an electronic device.

FIG. 4 is a flow chart illustrating an example method 400 to be performed by an active pen, such as the active pen 100, for being charged by an electronic device, such as the electronic device 300.

The method 400 starts with the active pen 100 checking at 402 whether it is receiving a charging voltage from the electronic device 300 via the charging contact 120. Responsive to determining at 402 that the active pen 100 is not receiving a charging voltage, the active pen 100 may start (or continue) to provide full power to the signal transmission module 108, as shown at 404. Although not explicitly shown, prior to providing full power to the signal transmission module 108, the active pen 100 may check whether the ground contact 116 is in electrically conductive contact with one or both of the control contact 118 and the charging contact 120, as described with respect to FIG. 2.

Responsive to the active pen 100 being placed in the charging dock of a suitable electronic device 300, the active pen 100 may determine at 402 that it is receiving a charging voltage from the electronic device 300 via the charging contact 120. In response, the active pen 100 may limit or deny full power from the battery module 110 to the signal transmission module 108, as shown at 406.

In order to prevent overheating of the battery module 110, the active pen 100 may be configured to control the voltage that is delivered to the battery module 110 based on a temperature of the battery module 110. The temperature of the battery module 110 may be monitored using a temperature sensor module comprised in the circuitry 109 of the active pen 100. This is shown at 408.

The temperature sensor module may produce a voltage level that is indicative of the temperature of the battery module 110. The active pen 100 may check at 410 whether this voltage level is indicative of a temperature that is within a specified range that is suitable for charging the batteries of the battery module 110. In one example, the active pen 100 may check at 410 whether the voltage level is indicative of a temperature that is less than a threshold temperature. The active pen 100 may sample the voltage level periodically, according to a timer. Alternatively, the active pen 100 may continuously monitor the voltage level, and thus the temperature of the battery module 110.

The active pen 100 may provide a voltage at the control contact 118 that is indicative of the temperature of the battery module 110. This voltage may be monitored by the electronic device 300. This will be described further with respect to FIG. 5. In one example, the voltage at the control contact 118 may be indicative of whether the temperature is determined by the active pen 100 to be within a suitable, specified range. In another example, the voltage at the control contact 118 may be indicative of an actual temperature of the battery module 110, such that the electronic device 300 may independently monitor the temperature of the battery module 110.

Responsive to detecting at 410 that the temperature of the battery module 110 is not within the specified range, the active pen 100 may limit or prevent a charging voltage from being delivered to the battery module 110, as shown at 412. At any point during this time, the active pen 100 may check that the pen contacts are separated, as shown at 202 in FIG. 2, and, if so, the active pen 100 may continue to limit full power to the signal transmission module, as shown at 206. Further, responsive to detecting at 402 that a charging voltage is being received from the electronic device 300, the active pen 100 may continue to monitor the temperature of the battery module 110, as shown at 408.

Responsive to detecting at 410 that the temperature of the battery module 110 is within the specified range, the active pen 100 may proceed to monitor the present voltage level of the one or more batteries of the battery module 110, as shown at 414. Feedback regarding the present battery voltage level, and thus the charge status of the battery, may be made available to the electronic device 300 via the charging contact 120 while charging is enabled. For example, with a current sensing resistor in series with the active pen circuitry, the voltage level at the charging contact 120 may reflect the voltage level of the battery module 110. Thus, in addition to the active pen 100 monitoring the voltage level of the battery module 110, the electronic device 300 may also monitor the voltage level of the battery module 110. This will be described further with respect to FIG. 5.

In one example, the active pen 100 may check at 416 whether the voltage level of the battery module 110 is less than an optimum, fully-charged voltage level. The active pen 100 may sample the battery voltage periodically, according to a timer.

Responsive to detecting at 416 that the battery voltage level is less than the optimum voltage level (that is, the battery module 110 is not fully charged), the active pen 100 may initiate or continue to provide a charging voltage to the battery module 110, as shown at 418. The active pen 100 may then continue to check at 402 whether a charging voltage is being received from the electronic device 300.

Responsive to detecting at 416 that the battery voltage level is not less than the optimum voltage level (that is, the battery module 110 is fully charged), the active pen 100 may limit or prevent a charging voltage from being delivered to the battery module 110, as shown at 412. The active pen 100 may then continue to check at 402 whether a charging voltage is being received from the electronic device 300.

While the example of FIG. 4 suggests that the charging of the battery module 110 is only initiated after checking the battery module temperature and checking the battery voltage level, the charging may alternatively be initiated between these steps, or prior to performing these steps. Furthermore, the checking of the battery module temperature and the checking of the battery voltage level may be performed in a different sequence than that illustrated in FIG. 4, and with different frequencies. For example, the active pen 100 may sample the temperature every 1 to 5 seconds, and may sample the battery voltage every 1 to 5 minutes.

Although not explicitly shown, at any point during the method 400, the active pen 100 may check for electrically conductive contact between the ground contact 116 and one or both of the control contact 118 and the charging contact 120, as described with respect to FIG. 2. However, the active pen 100 may prioritize detection of a charging voltage at the charging contact 120, as shown at 402, over detection of separation of the pen contacts, as shown at 202. That is, as long as the active pen 100 continues to detect a charging voltage at its charging contact, the active pen 100 may determine that it is docked and forgo checking whether the pen contacts are separated.

Figure 5:
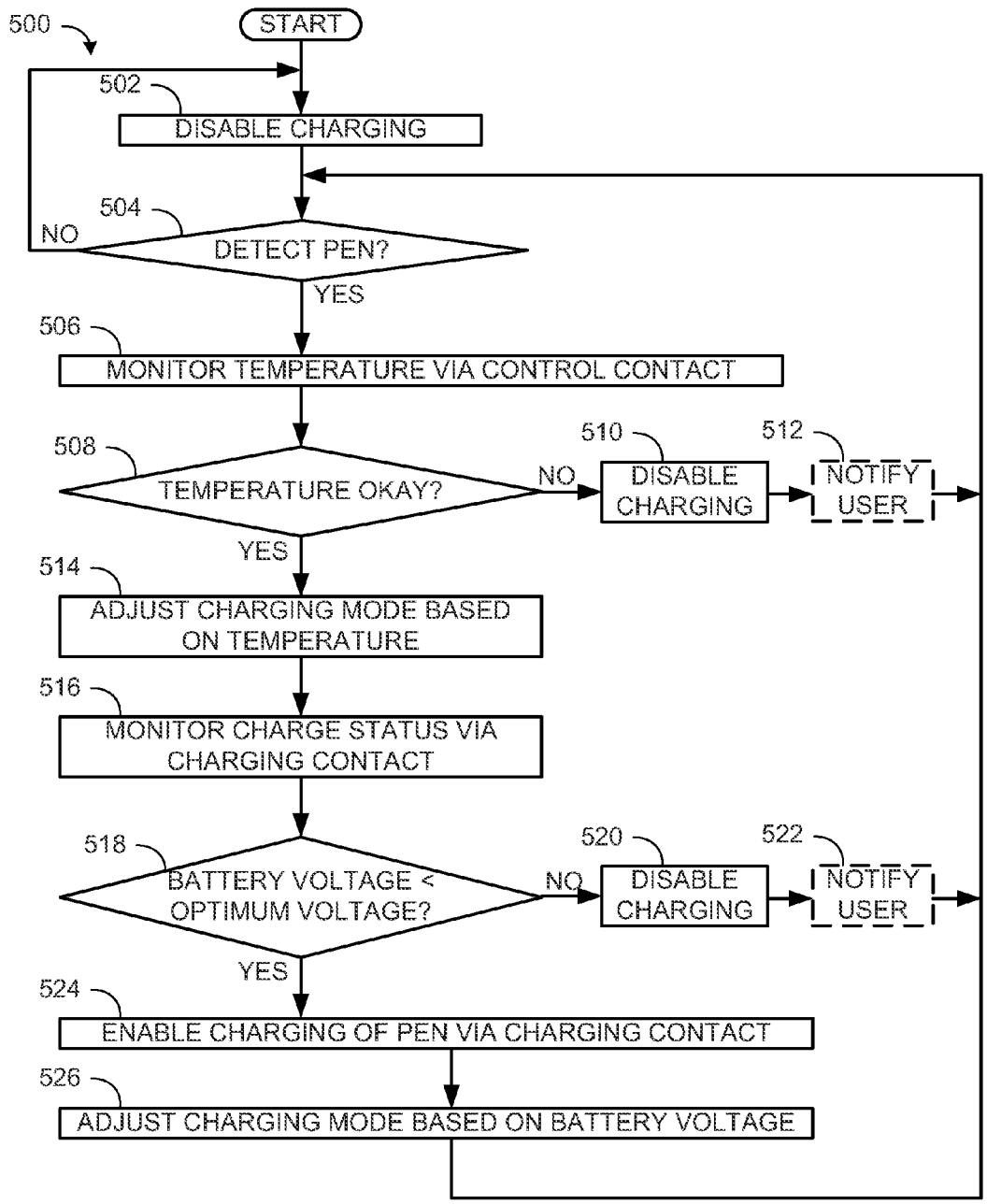
FIG. 5 is a flow chart illustrating a first example method to be performed by an electronic device for charging an active pen.

FIG. 5 is a flow chart illustrating an example method 500 to be performed by an electronic device, such as the electronic device 300, for charging an active pen, such as the active pen 100.

The method 500 begins with the electronic device 300 being in a state in which charging is disabled, as shown at 502. That is, the electronic device 300 is not providing a charging voltage via the charging contact 320.

At 504, the electronic device 300 may check whether it has detected the presence of the active pen 100 in the charging dock.

In one example, the electronic device 300 may periodically sample the voltage level on the control contact 318, according to a timer. When there is no active pen in the charging dock, the control contact 318 may be exposed (that is, the exterior surface of control contact 318 may not be in electrically conductive contact with any other electrical contact), and may have a particular, known voltage level. In contrast, when the active pen 100 is placed in the charging dock, the control contact 118 of the active pen 100 comes into electrically conductive contact with the control contact 318 of the electronic device 300. Thus, the voltage level at the control contact 318 may be set to the voltage level of the control contact 118, for example, a voltage level indicative of the temperature of the battery module 110 of the active pen 100. In one example, the electronic device 300 samples the voltage level of the control contact 318 once every second to determine if an active pen is present in the charging dock.

In another example, the electronic device 300 may comprise a mechanical switch that is actuated upon placing an active pen in the charging dock. Actuation of the switch may generate a signal notifying the electronic device 300 that an active pen is present.

Responsive to determining at 504 that no active pen has been detected, the electronic device 300 may continue to disable charging, as shown at 502.

Responsive to determining at 504 that an active pen, such as the active pen 100, has been detected, the electronic device 300 may proceed, at 506, to monitor the control contact 318, thereby monitoring the temperature information that is output by the active pen 100 via the control contact 118.

At 508, the electronic device 300 may check whether the voltage level at the control contact 318 is indicative of the temperature of the battery module 110 being within a suitable, specified range. Although not required, the electronic device 300 may independently determine whether the temperature of the battery module 110 is within a suitable, specified range. This may be particularly useful in cases where the active pen is electrically damaged or defective and unable to give feedback to electronic device 300 regarding the temperature of the battery module 110.

Responsive to detecting at 508 that the temperature of the battery module 110 is not within the specified range, for example that the temperature exceeds a threshold temperature, the electronic device 300 may disable charging of the active pen 100, as shown at 510. Optionally, the electronic device 300 may generate a user-output notification at 512 to notify the user that charging of the active pen 100 has been disabled, and optionally that the charging has been disabled due to the detection of an unsuitable temperature of the battery module 110. The electronic device 300 may then continue to check that the active pen 100 is present, as shown at 504, and, if so, to monitor the temperature of the battery module 110 via the control contact 318, as shown at 506.

Responsive to detecting at 508 that the temperature of the battery module 110 is within the specified range, the electronic device 300 may proceed, at 514, to adjust the present charging mode based on the temperature of the battery module 110. Three example charging modes include a fast charging mode, a slow charging mode and a maintenance charging mode. In one example, if the battery temperature is approaching the maximum acceptable battery temperature, the electronic device 300 may switch to the maintenance charging mode or to the stop charging mode, according to the specifications for the battery in use.

At 516, the electronic device 300 may monitor the charging contact 320, thereby monitoring the charge status that is output by the active pen 100 via the charging contact 120.

The electronic device 300 may proceed to check at 518 whether the present battery voltage level is less than an optimum, fully-charged voltage level. The electronic device 300 may periodically sample the battery voltage level at the charging contact 320, according to a timer.

Responsive to detecting at 518 that the battery voltage level is less than the optimum voltage level (that is, the battery module 110 is not fully charged), the electronic device 300 may enable charging of the active pen 110 via the charging contact 320, as shown at 524. The electronic device 300 may then proceed to adjust the charging mode based on the present battery voltage level, as shown at 526. For example, the electronic device 300 may initially enable charging of the active pen 110 using the fast charging mode, and if the battery voltage level is determined to be close to the optimum voltage level, the electronic device 300 may switch to the maintenance charging mode or to the stop charging mode, according to the specifications for the battery in use.

At this point, the electronic device 300 may continue to check that the active pen 100 is present, as shown at 504, and, if so, to monitor the temperature of the battery module 110 via the voltage level detected at the control contact 318, as shown at 506.

Responsive to detecting at 518 that the battery voltage level is not less than the optimum voltage level (that is, the battery module 110 is fully charged), the electronic device 300 may disable charging of the active pen 100, as shown at 520. Optionally, the electronic device 300 may generate a user-output notification at 522 to notify the user that the active pen 100 is fully charged, and optionally that charging of the active pen 100 has been disabled. The electronic device 300 may then continue to check that the active pen 100 is present, as shown at 504, and, if so, to monitor the temperature of the battery module 110 via the voltage level detected at the control contact 318, as shown at 506.

While the example of FIG. 5 suggests that charging of the active pen 100 is only initiated after checking the battery module temperature and checking the battery voltage level, the charging may alternatively be initiated between these steps, or prior to performing these steps. Furthermore, the checking of the battery module temperature and the checking of the battery voltage level may be performed in a different sequence than that illustrated in FIG. 5, and with different frequencies. For example, the electronic device 300 may check whether the active pen 100 is present once every second, may sample the temperature every 1 to 5 seconds, and may sample the battery voltage every 1 to 5 minutes. In addition, after determining at 518 that the battery module 110 is fully charged, after disabling the charging at 520, and after optionally generating the user-output notification at 522, the electronic device 300 may enter a maintenance mode, in which it samples the temperature and/or battery voltage level less frequently, for example, every 1 to 15 minutes.

It may be of interest to ensure that the recharging methods described with respect to FIGS. 4 and 5 are only permitted when an active pen has been authorized by an electronic device. For example, where an active pen comprises a battery module that is incompatible with any of the charging modes offered by an electronic device, it may be advantageous to prevent the electronic device from providing a charging voltage to that active pen. By ensuring that the electronic device only charges an authorized active pen, it may be possible to avoid suboptimal battery charging scenarios (that is, where the electronic device provides a voltage that is insufficient to fully charge the battery module of the active pen), and it may also be possible to avoid potentially dangerous battery charging scenarios (for example, where the electronic device provides a voltage that is too high for the battery module or where the electronic device provides a voltage to a defective, counterfeit battery).

Figure 6:
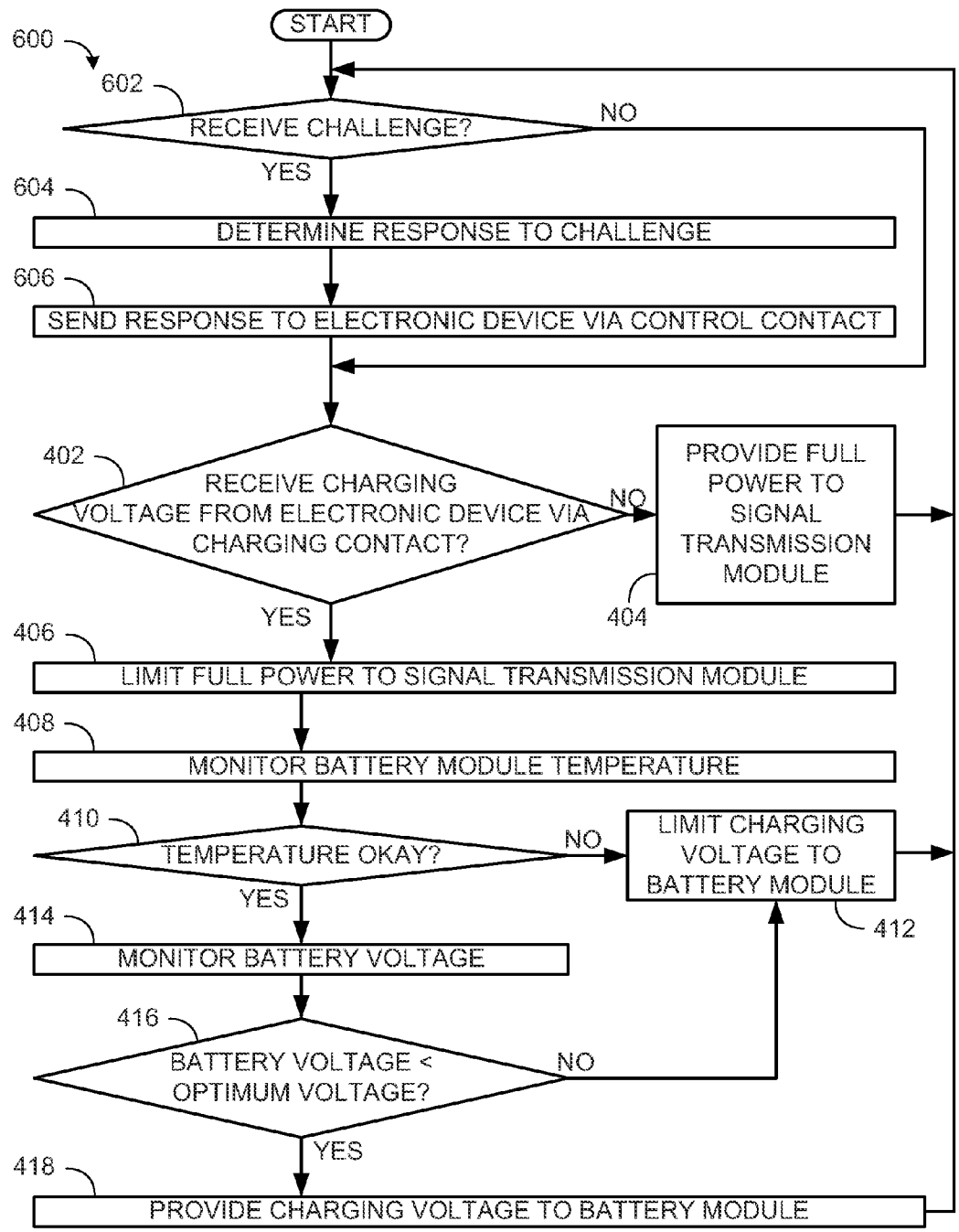
FIG. 6 is a flow chart illustrating a second example method to be performed by an active pen for being charged by an electronic device.

FIG. 6 is a flow chart illustrating an example method 600 to be performed by an active pen, such as the active pen 100, for being charged by an electronic device, such as the electronic device 300. In contrast to the example method of FIG. 4, this method involves steps for authorization of the active pen 100 prior to receiving a charging voltage from the electronic device 300.

Responsive to the active pen 100 being placed in the charging dock of a suitable electronic device 300, the active pen 100 may determine at 602 that it has received a challenge from the electronic device 300 via the control contact 118. The challenge may be received by an authorization module of the active pen 100. In the case that the challenge is encrypted, the challenge may be decrypted (not shown) by the authorization module, as described further with respect to FIG. 8. In the case that a challenge is not received at 602, the method proceeds according to the method illustrated in FIG. 4 (that is, steps 402 to 418, which are described again below).

Where the active pen 100 does receive a challenge at 602, the authorization module of the active pen 100 may determine a response to the challenge, as shown at 604. The response may comprise one or more of a secure code, a personal identification number (PIN), a battery type associated with the battery module 110, a battery log, a model number of the active pen 100, or any other information related to the active pen 100 and/or the battery module 110. In one example, the challenge may comprise an encrypted timestamp corresponding to a time when the active pen 100 last exchanged data with the electronic device 300. The active pen 100 could decrypt the challenge and respond with an authentication code generated based on the data supplied by the electronic device 300. An internal clock of the active pen 100 may be synchronized with an internal clock of the electronic device 300.

Figure 8:
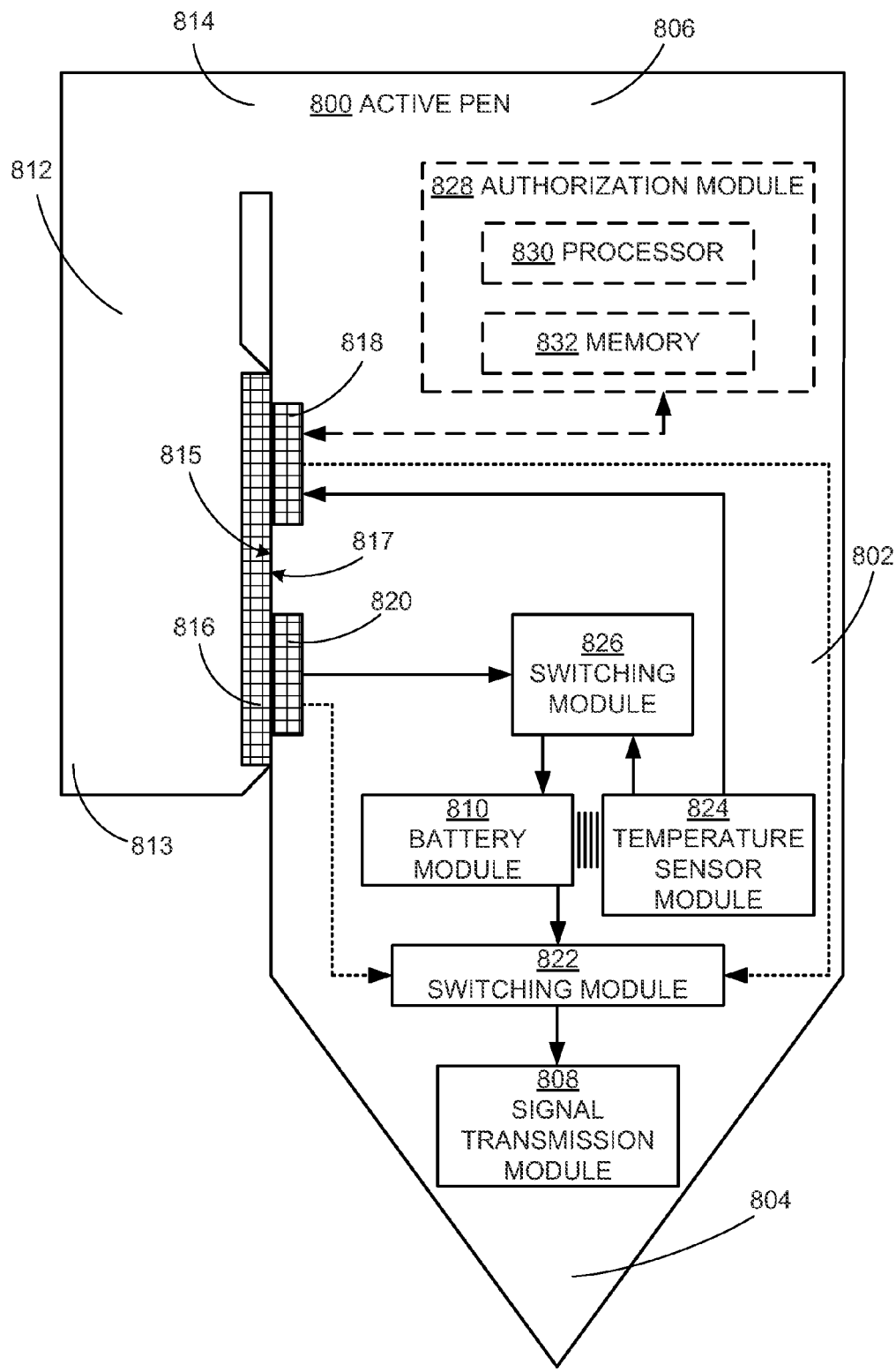
FIG. 8 is a block diagram illustrating an example active pen.

The response to the challenge may optionally be encrypted (not shown) by the authorization module, as described further with respect to FIG. 8. The response may then be sent to the electronic device 300 via the control contact 118 of the active pen 100, as shown at 606.

In the case that the response sent to the electronic device 300 at 606 is not the correct response to the challenge received by the active pen 100 at 602, the active pen 100 may determine at 402 that it is not receiving a charging voltage from the electronic device 300 via the charging contact 120. At this point, the active pen 100 may start (or continue) to provide full power to the signal transmission module 108, as shown at 404. Although not explicitly shown, prior to providing full power to the signal transmission module 108, the active pen 100 may check whether the ground contact 116 is in electrically conductive contact with one or both of the control contact 118 and the charging contact 120, as described with respect to FIG. 2 and FIG. 4.

In the case that the response sent to the electronic device 300 at 606 is the correct response to the challenge received by the active pen 100 at 602, the active pen 100 may determine at 402 that it is receiving a charging voltage from the electronic device 300 via the charging contact 120. In response, the active pen 100 may limit or deny full power from the battery module 110 to the signal transmission module 108, as shown at 406.

As described previously with respect to FIG. 4, the temperature of the battery module 110 may be monitored using the temperature sensor module, as shown at 408.

The active pen 100 may periodically or continuously check at 410 whether the temperature sensed by the temperature sensor module is within a suitable, specified range. The active pen 100 may provide a voltage level at the control contact 118 that is indicative of the temperature of the battery module 110, such that the electronic device 300 may obtain feedback regarding battery temperature.

Responsive to detecting at 410 that the temperature of the battery module 110 is not within the specified range, the active pen 100 may limit or prevent a charging voltage from being delivered to the battery module 110, as shown at 412. At any point during this time, the active pen 100 may receive another challenge, as shown at 602, and may determine a response to the challenge at 604, and send the response to the electronic device 300 at 606. Responsive to detecting at 402 that a charging voltage is being received from the electronic device 300, the active pen 100 may continue to limit full power to the signal transmission module 108, as shown at 406, and to monitor the temperature of the battery module 110, as shown at 408.

Responsive to detecting at 410 that the temperature of the battery module 110 is within the specified range, the active pen 100 may proceed to monitor the battery voltage level, as shown at 414, and may make the charge status of the battery available to the electronic device 300 via the charging contact 120 while charging is enabled, as described previously.

Responsive to detecting at 416 that the battery voltage level is less than the optimum voltage level, the active pen 100 may initiate or continue to provide a charging voltage to the battery module 110, as shown at 418. At any point during this time, the active pen 100 may receive another challenge, as shown at 602, and may determine a response to the challenge at 604, and send the response to the electronic device 300 at 606. Responsive to detecting at 402 that a charging voltage is being received from the electronic device 300, the active pen 100 may continue to limit full power to the signal transmission module 108, as shown at 406, and to monitor the temperature of the battery module 110, as shown at 408.

Responsive to detecting at 416 that the battery voltage level is not less than the optimum voltage level, the active pen 100 may limit or prevent a charging voltage from being delivered to the battery module 110, as shown at 412. The active pen 100 may proceed to check at 602 whether a challenge has been received.

While the example of FIG. 6 suggests that the charging of the battery module 110 is only initiated after checking the battery module temperature and checking the battery voltage level, the charging may alternatively be initiated between these steps, or prior to performing these steps. For example, the active pen 100 may provide the charging voltage to the battery module immediately upon receiving the charging voltage from the electronic device 300 at 402, and then proceed to monitor the temperature and the voltage level. As described previously with respect to FIG. 4, the checking of the battery module temperature and the checking of the battery voltage level may be performed in a different sequence than that illustrated in FIG. 6, and with different frequencies. For example, the active pen 100 may sample the temperature every 1 to 5 seconds, and may sample the battery voltage level every 1 to 5 minutes. In addition, after determining at 416 that the battery module 110 is fully charged and after limiting or preventing the charging voltage from being provided to the battery module at 412, the active pen 100 may enter a maintenance mode, in which it samples the temperature and/or battery voltage level less frequently, for example, every 1 to 15 minutes.

As described with respect to FIG. 4, at any point during the method 600, the active pen 100 may check for electrically conductive contact between the ground contact 116 and one or both of the control contact 118 and the charging contact 120, as described with respect to FIG. 2. However, the active pen 100 may prioritize detection of a charging voltage at the charging contact 120, as shown at 402, over detection of separation of the pen contacts, as shown at 202.

Figure 7:
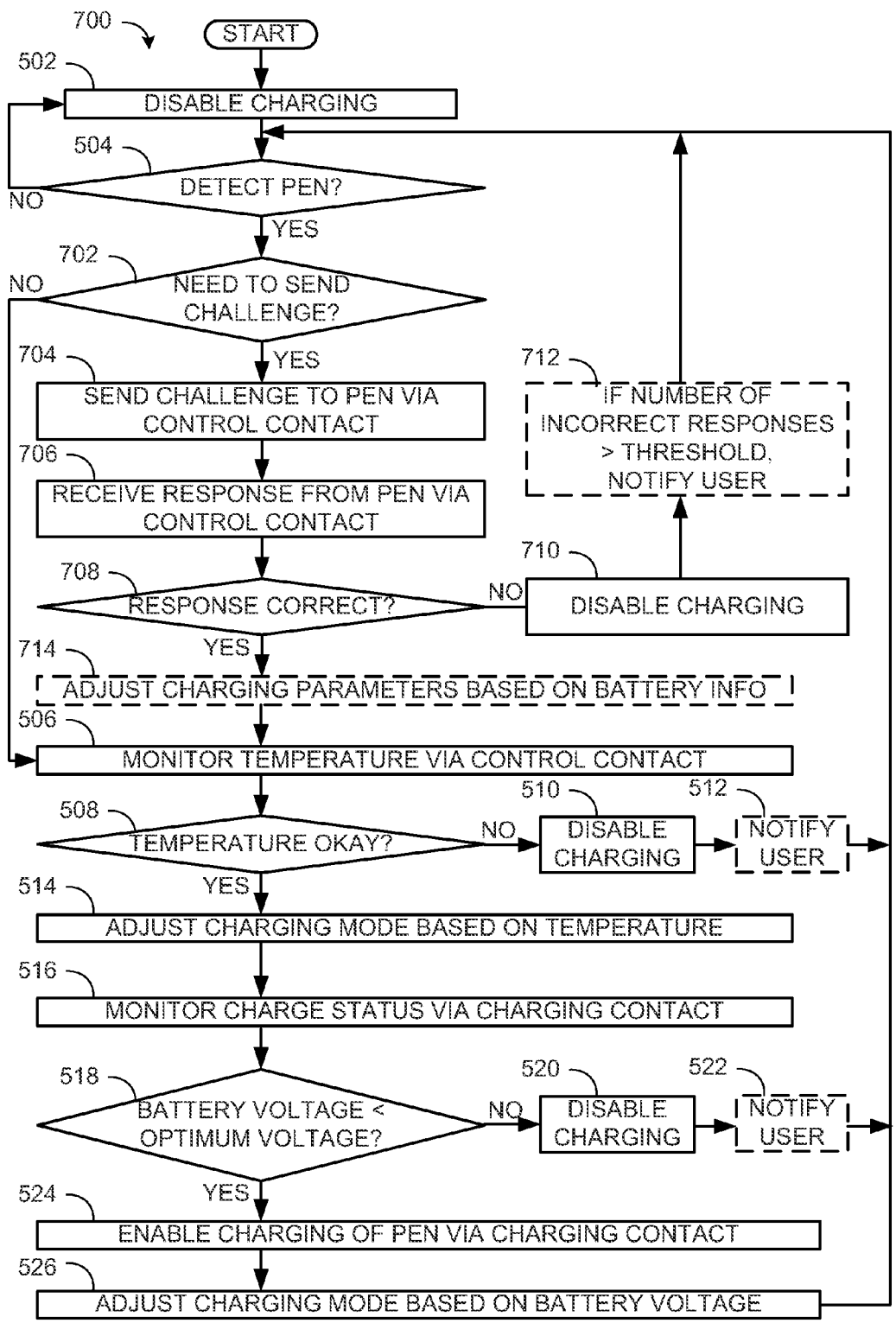
FIG. 7 is a flow chart illustrating a second example method to be performed by an electronic device for charging an active pen.

FIG. 7 is a flow chart illustrating an example method 700 to be performed by an electronic device, such as the electronic device 300, for charging an active pen, such as the active pen 100. In contrast to the example method of FIG. 5, this method involves steps for authorization of the active pen 100 prior to enabling charging thereof.

Similarly to the method 500 described with respect to FIG. 5, the method 700 begins with the electronic device 300 being in a state in which charging is disabled, as shown at 502. At 504, the electronic device 300 may check whether it has detected the presence of the active pen 100 in the charging dock. The electronic device 300 may check for the presence of the active pen 100 as often as is required so as not to miss a pen swap. In one example, the electronic device 300 samples the voltage level of the control contact 318 once every second to determine if an active pen is present in the charging dock. However, more frequent or less frequent sampling may be used.

Responsive to determining at 504 that no active pen has been detected, the electronic device 300 may continue to disable charging, as shown at 502.

Responsive to determining at 504 that an active pen, such as the active pen 100, has been detected, the electronic device 300 may check, at 702, whether there is a need to send a challenge to the active pen 100. Responsive to determining that there is no need to send a challenge, the method proceeds according to the method illustrated in FIG. 5 (that is, steps 506 to 526, which are described again below).

Where the electronic device 300 determines at 702 that there is a need to send a challenge to the active pen 100, the electronic device 300 proceeds to send a challenge to the active pen 100 via the control contact 318, as shown at 704. The challenge may be encrypted by the electronic device 300.

At 706, the electronic device 300 may receive a response to the challenge via the control contact 318. In the case that the response is encrypted, the electronic device 300 may decrypt the response. As described with respect to FIG. 6, the response may comprise one or more of a secure code, a personal identification number (PIN), a battery type associated with the battery module 110, a battery log, a model number of the active pen 100, or any other information related to the active pen 100 and/or the battery module 110.

The electronic device 300 may proceed to check at 708 whether the response received via the control contact 318 at 706 is the correct response to the challenge sent at 702. For example, the electronic device 300 may compare the received response to an expected response to the challenge. If the responses match, the electronic device 300 may determine that the received response is the correct response. Depending on the challenge response method used, there may be more than one correct response to a given challenge.

Responsive to the electronic device 300 determining at 708 that the received response is not correct, the electronic device 300 may disable charging at 710, and check for the presence of an active pen at 504. If an active pen is detected at 504, the electronic device 300 may determine at 702 that it has a need to send another challenge, and proceed to send another challenge at 704 via the control contact 318. This challenge may be the same as the previous challenge, or may be a different challenge.

Again, the electronic device 300 may receive a response at 706 and may check at 708 whether the response is the correct response to the challenge sent at 704.

Where the electronic device 300 determines that the response is incorrect and that the number of consecutive incorrect responses meets or exceeds a specified threshold, the electronic device 300 may generate a user-output notification at 712 to notify the user that the active pen 100 is not authorized to be charged by the electronic device 300, and optionally that the electronic device 300 has received a maximum number of incorrect responses to the challenge.

Responsive to the electronic device 300 determining at 708 that the received response is the correct response, the electronic device 300 may optionally adjust charging parameters based on battery information of the active pen 100 from which the response was received, as shown at 714. For example, the electronic device 300 may use battery information received in the response to set a suitable charging profile for the battery module 110. Properties of a charging profile may include a voltage level to be supplied to the battery, the duty cycle, and the like.

As described previously with respect to FIG. 5, the electronic device 300 may then proceed to monitor the control contact 318 for temperature information output by the active pen 100 via the control contact 118, as shown at 506.

At 508, the electronic device 300 may sample the voltage level at the control contact 318 to determine whether the temperature of the battery module 110 is within a suitable, specified range.

Responsive to detecting at 508 that the temperature of the battery module 110 is not within the specified range, the electronic device 300 may disable charging of the active pen 100, as shown at 510. Optionally, the electronic device 300 may generate a user-output notification at 512 to notify the user that charging of the active pen 100 has been disabled, and optionally that the charging has been disabled due to the detection of an unsuitable temperature of the battery module 110. The electronic device 300 may then continue to check that the active pen 100 is present, as shown at 504. If the active pen 100 is present and the electronic device 300 determines at 702 that there is no need to send another challenge to the active pen 100, the electronic device 300 may proceed to monitor the temperature of the battery module 110 via the control contact 318, as shown at 506.

Responsive to detecting at 508 that the temperature of the battery module 110 is within the specified range, the electronic device 300 may proceed, at 514, to adjust the current charging mode based on the temperature of the battery module 110.

At 516, the electronic device 300 may monitor the voltage level at the charging contact 320, thereby monitoring the charge status that is output by the active pen 100 via the charging contact 120.

The electronic device 300 may proceed to check at 518 whether the current battery voltage level is less than an optimum, fully-charged voltage level. The electronic device 300 may periodically sample the battery voltage level at the charging contact 320, according to a timer.

Responsive to detecting at 518 that the battery voltage level is less than the optimum voltage level, the electronic device 300 may enable charging of the active pen 110 via the charging contact 320, as shown at 524. The electronic device 300 may then proceed to adjust the charging mode based on the battery voltage, as shown at 526.

At this point, the electronic device 300 may continue to check that the active pen 100 is present, as shown at 504. If the active pen 100 is present and the electronic device 300 determines at 702 that there is no need to send another challenge to the active pen 100, the electronic device 300 may proceed to monitor the temperature of the battery module 110 via the control contact 318, as shown at 506.

Responsive to detecting at 518 that the battery voltage level is not less than the optimum voltage level, the electronic device 300 may disable charging of the active pen 100, as shown at 520. Optionally, the electronic device 300 may generate a user-output notification at 522 to notify the user that the active pen 100 is fully charged, and optionally that charging of the active pen 100 has been disabled. The electronic device 300 may then continue to check that the active pen 100 is present, as shown at 504.

While the example of FIG. 7 suggests that charging of the active pen 100 is only initiated after checking the battery module temperature and checking the battery voltage level, the charging may alternatively be initiated between these steps, or prior to performing these steps. For example, the electronic device 300 may enable charging immediately upon determining that the response received at the control contact 318 is the correct response to the challenge, and then proceed to monitor the temperature and the voltage level. As described previously with respect to FIG. 5, the checking of the battery module temperature and the checking of the battery voltage level may be performed in a different sequence than that illustrated in FIG. 7, and with different frequencies. For example, the electronic device 300 may check whether the active pen 100 is present once every second, may sample the temperature every 1 to 5 seconds, and may sample the battery voltage level every 1 to 5 minutes. In addition, after determining at 518 that the battery module 110 is fully charged, after disabling the charging at 520, and after optionally generating the user-output notification at 522, the electronic device 300 may enter a maintenance mode, in which it samples the temperature and/or battery voltage level less frequently, for example, every 1 to 15 minutes. Once it is determined at 504 that an active pen is present, the electronic device 300 may, from time to time, determine that there is a need to send a challenge to the active pen. In one example, the electronic device 300 may determine that there is a need to send a challenge each time the determination at 504 is positive (that is, an active pen is detected). In another example, the electronic device 300 may determine that there is a need to send a challenge each time the determination at 504 is newly positive (that is, the electronic device 300 detects an active pen at 504 following a period in which it did not detect an active pen at 504). In yet another example, the electronic device 300 may determine that there is a need to send a challenge after a certain period of time from the sending of a previous challenge. For example, a challenge may be sent every 5 minutes. In a further example, a electronic device 300 may determine that there is a need to send a challenge when charging has recently been disabled at 510 due to a determination at 508 that the temperature of the battery module 110 is too high, or when charging has recently been disabled at 520 due to a determination at 518 that the battery module 110 is fully charged.

Numerous hardware and/or software solutions may be used to provide the functionality described with respect to FIGS. 1-1 to 7. Examples of these solutions are described with respect to FIGS. 8 and 9.

FIG. 8 is a block diagram illustrating an example active pen 800. The active pen 800 is an example of the active pen 100. The active pen 800 may comprise additional components which, for clarity, are not illustrated in FIG. 8.

The active pen 800 comprises an elongated body member 802 that includes a tip 804 and a rear end 806. The body member 802 comprises a signal transmission module 808 and a battery module 810. The signal transmission module 808 is configurable to transmit a signal that is detectable by an associated touch screen of an electronic device, such as the electronic device 300, when the tip 804 is proximal to the touch screen. The battery module 810 may comprise one or more batteries and is configurable to provide power to the signal transmission module 808.

The one or more batteries of the battery module 810 may be rechargeable. The one or more batteries of the battery module 810 may be removable or non-removable. In the case where the one or more batteries are removable, the active pen 800 may comprise a removable cover or housing portion that, when removed, enables access to the battery module 810. In one example, the battery module 810 comprises one or more LiIon batteries providing a voltage of 3.6 Volts. In another example, the battery module 810 comprises one or more NiMH batteries providing a voltage of 1.2 Volts. The type of rechargeable batteries used may be selected based on one or more of the energy density (size), the voltage rate (technology type), the charging current (fast charging, slow charging, and maintenance charging), the number of charging/discharging cycles (for example, more than 1000 cycles), the self-discharging rate (for example, less than 30% per month), the depth-of-discharge, the cost, and the like.

In addition to the body member 802, the active pen 800 comprises an elongated clip member 812, which may be permanently or removably attached to the body member 802 via at least one connection 814. The connection 814 may be located proximal the rear end 806 of the body member 802, such that the clip member 812 comprises a free end 813 that is not connected to the body member 802.

In normal operating conditions, the longitudinal axes of the clip member 812 and the body member 802 are substantially parallel and the free end 813 of the clip member 812 is biased such that a body-facing surface 815 of the clip member 812 is in contact with a clip-facing surface 817 of the body member 802, as shown in FIG. 8.

The body-facing surface 815 comprises an electrically conductive contact 116, which is internally connected to a ground voltage of the active pen 800. The clip-facing surface 817 of the body member 802 comprises a control contact 818 and a charging contact 820, which may be configured in any suitable manner, provided that both the control contact 818 and the charging contact 820 are in electrically conductive contact with the ground contact 816 of the clip 812 during normal operating conditions.

A switching module 822 may be used to control whether power is provided from the battery module 810 to the signal transmission module 808. For example, while the ground contact 816 is in electrically conductive contact with the control contact 818 and the charging contact 820, the switching module 822 may be configured to supply power from the battery module 810 to the signal transmission module 808, as shown at 204 in FIG. 2 and at 404 in FIGS. 4 and 6. In these circumstances, the active pen 800 may be configured to transmit a signal, and consequently may be considered to be in an active state.

In contrast, while the ground contact 816 is not in electrically conductive contact with one or both of the control contact 818 and the charging contact 820, the switching module 822 may be configured to limit or to deny full power from the battery module 810 to the signal transmission module 808, as shown at 206 in FIG. 2. In these circumstances, the active pen 800 may not be configured to transmit a signal, and consequently may be considered to be in a deactivated state. This may occur, for example, when the clip member 812 is separated from the body member 802 by a piece of clothing. Alternatively or additionally, responsive to receiving a charging voltage at the charging contact 820, the switching module 822 may be configured to limit or to deny full power from the battery module 810 to the signal transmission module 808, as shown at 406 in FIGS. 4 and 6.

Although not explicitly illustrated, the switching module 822 may optionally comprise a processor and a memory.

The body member 802 may comprise a temperature sensor module 824 and a switching module 826 that are configurable to prevent overheating of the battery module 810. In one example, the temperature sensor module 824 and the switching module 826 may be implemented as a divisor formed between a thermistor and a resistor in series with the circuit. The electrical resistance of the thermistor may be dependent on the temperature of the battery module 810, such that a change in battery temperature is translated into a change in voltage level. Depending on this voltage level, the switching module 826 may be configurable to limit the charging voltage that is provided from the charging contact 820 to the battery module 810, as shown at 412 in FIGS. 4 and 6.

In one example, the voltage level indicative of the battery temperature may be detectable via the control contact 818 of the active pen 800. This will be described further with respect to FIG. 9.

The body member 802 may further comprise an authorization module 828 which may be configurable to provide authorization information to an electronic device via the control contact 818. The authorization module 828 may optionally comprise a processor 830 and a memory 832. The memory 832 may store code which, when executed by the processor 830, causes the active pen 800 to perform any of the actions 602, 604 and 606. That is, when the active pen 800 has been placed in a charging dock of an electronic device, the authorization module 828 may be configurable to determine whether a challenge has been received from the electronic device, via the control contact 818, as shown at 602. The authorization module 828 may be configurable to determine a response to the challenge, as shown at 604. The authorization module 828 may be configurable to send the response to the electronic device via the control contact 818, as shown at 606. Alternatively, the authorization module 828 need not include a processor or memory, and may be configurable to cause the active pen 800 to perform any of the actions 602, 604 and 606 using dedicated hardware.

Where the challenge is encrypted, the authorization module 828 may be configurable to decrypt the challenge. The authorization module 828 may also be configurable to encrypt the response prior to sending it to the electronic device.

A single wire protocol may be used to exchange authorization information between the active pen 800 and an electronic device via the control contact 818. For example, the electronic device may send a challenge to the active pen 800, and, a few milliseconds later, the active pen 800 may respond with the authentication response. Both the electronic device and the active pen 800 may share a single communication line and transmit data sequentially.

Although not explicitly shown, any of the contacts 816, 818 and 820 may be connected to ESD diodes to reduce the risk of electrostatic discharge, for example, when clipping the active pen 800 onto a piece of clothing.

Figure 9:
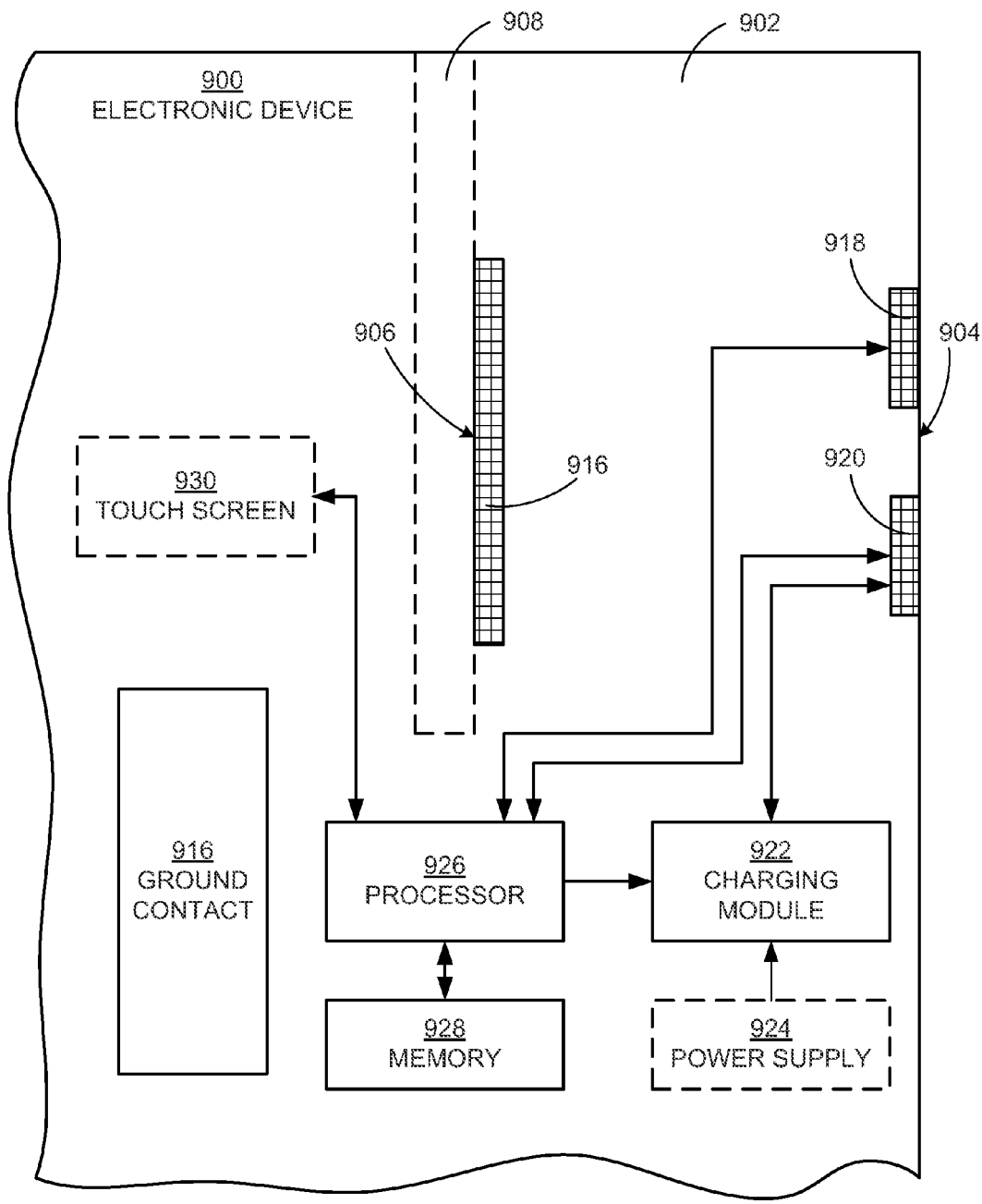
FIG. 9 is a block diagram illustrating an example electronic device configurable to charge an active pen.

FIG. 9 is a block diagram illustrating an example electronic device 900 that is configurable to charge the active pen 800. The electronic device 900 is an example of the electronic device 300.

The electronic device 900 comprises a partition member 902 having a first surface 904 that is coincident with an external surface of the electronic device 900 and a second opposing surface 906 that is coincident with an internal surface of a cavity 908 within a body of the electronic device 900. The partition member 902 is configured to separate the body-facing surface 815 of the clip member 812 of the active pen 800 from the clip-facing surface 817 of the body member 802 of the active pen 800. The cavity 908 is configured to receive at least the free end 813 of the clip member 812, and optionally some or all of the remainder of the clip member 812.

The first surface 904 comprises a control contact 918 and a charging contact 920. The second surface 906 comprises a ground contact 916 that is connected to a ground voltage of the electronic device 900. The contacts 916, 918 and 920 are positioned in the electronic device 900 such that, when the free end 813 of the clip member 812 of the active pen 800 is inserted into the cavity 908, the contacts 916, 918 and 920 are in electrically conductive contact with the corresponding contacts 816, 818 and 820. That is, the ground contact 916 of the electronic device 900 is configurable to be in electrically conductive contact with ground contact 816 on the body-facing surface 815 of the clip member 812, the control contact 918 is configurable to be in electrically conductive contact with the control contact 818 on the clip-facing surface 817 on the body member 802 of the active pen 800, and the charging contact 920 is configurable to be in electrically conductive contact with the charging contact 820 on the body member 802 of the active pen 800.

Together, the partition member 902, the ground contact 916, the control contact 918 and the charging contact 920 may be referred to as a "charging dock" for the active pen 800.

A charging module 922 of the electronic device 900 may be configurable to provide or to deny a charging voltage to the active pen 800 via the charging contact 920. In one example, the charging module 922 may convert a voltage received from a power supply 924 to a voltage suitable for charging the active pen 800. For example, the power supply 924 may be an internal power supply of the electronic device 900, such as a battery. Alternatively, the power supply 924 may be an external power supply, such as an electrical outlet.

The electronic device 900 may optionally comprise a processor 926 and a memory 928. The memory 928 may store code which, when executed by the processor 926, results in any of the steps of the method 500 and/or the method 700. Alternatively the electronic device 900 need not comprise a processor or a memory. For example, the electronic device 900 may not include a processor or a memory where the electronic device 900 is a simple charging device and/or where the active pen is solely responsible for monitoring the charging process.

The electronic device 900 may also comprise a touch screen 930, which may include active digitizer technology permitting detection of the presence and position of the active pen 800 when the active pen 800 is in an active state (that is, transmitting a signal) and the active pen 800 is within a certain proximity of the touch screen 930, or has a specified orientation relative to the touch screen 930, or both.

For example, the electronic device 900 may be configurable to cause the charging module 922 to disable charging, as shown at 502 in FIGS. 5 and 7. The electronic device 900 may also be configurable to detect whether the active pen 800 is present in the charging dock, as shown at 504. For example, the electronic device 900 may be configurable to periodically sample the voltage level on the control contact 918. Alternatively or additionally, the electronic device 900 may be configurable to receive a notification from a mechanical switch (not shown) that is actuated upon placing the active pen 800 in the charging dock.

In the case of the method 700, the electronic device 900 may be configurable, in response to determining that the active pen 800 has been detected as present in the charging dock, to determine at 702 that there is a need to send a challenge to the active pen 800, and to cause the challenge to be sent to the active pen 800 via the control contact 918, as shown at 704. The electronic device 900 may also be configurable to encrypt the challenge. In one example, the electronic device 900 may determine a correct response to the challenge, which it may store in the memory 928.

The electronic device 900 may be configurable to receive a response to the challenge via the control contact 918, as shown at 706 in FIG. 7. In the case that the response is encrypted, the electronic device 900 may be configurable to decrypt the response. The response may comprise one or more of a secure code, a PIN, a battery type associated with the battery module 810 of the active pen 800, a battery log associated with the battery module 810, a model number of the active pen 800, or any other information related to the active pen 800 and/or the battery module 810. Any or all of the response may be stored in the memory 928.

The electronic device 900 may be configurable to determine whether the response received via the control contact 918 is correct, as shown at 708. For example, the electronic device 900 may compare the received response to a correct response stored in the memory 928.

Where it is determined that the received response is incorrect, the electronic device 900 may make a log of this in the memory 928. The electronic device 900 may be configurable to disable charging at 710 and to generate a user-output notification at 712 to notify the user that the active pen 800 is not authorized to be charged by the electronic device 900, and optionally that the electronic device 900 has received a maximum number of incorrect responses to the challenge. For example, the electronic device 900 may cause a message to be displayed on the touch screen 930.

Where it is determined that the received response is correct, and where the response comprises battery information of the active pen 800, the electronic device 900 may optionally cause the charging module 922 to adjust its operation in accordance with the battery information, as shown at 714. For example, the electronic device 900 may cause the charging module 922 to apply a charging profile that is suitable for a battery having that particular battery information. Properties of one or more charging profiles, such as the voltage level to be supplied to the battery, the duty cycle, and the like, may be stored in the memory 928.

The electronic device 900 may be configurable to monitor the control contact 918 for temperature information received from the active pen 800, as shown at 506 in FIGS. 5 and 7. In one example, the electronic device 900 may be configurable to periodically sample the voltage level at the control contact 918 to determine whether the temperature of the battery module 810 of the active pen 800 is within a suitable, specified range, as shown at 508.

Where it is determined from the voltage level at the control contract 918 that the temperature of the battery module is not within the specified range, the electronic device 900 may be configurable to cause the charging module 922 to disable charging, as shown at 510. Optionally, the electronic device 900 may be configurable to generate a user-output notification to notify the user that charging of the active pen 800 has been disabled, and optionally that the charging has been disabled due to the detection of an unsuitable temperature of the battery module 810, as shown at 512. For example, the electronic device 900 may cause a message to be displayed on the touch screen 930.

Where it is determined from the voltage level at the control contact 918 that the temperature of the battery module 810 is within the specified range, the electronic device 900 may be configurable to cause the charging module 922 to adjust the current charging mode based on the temperature of the battery module 810, as shown at 514.

The electronic device 900 may be configurable to monitor the charging contact 920, thereby monitoring the charge status that is output by the active pen 800. In one example, the electronic device 900 may be configurable to periodically sample the voltage level at the charging contact 920 to determine whether the current battery voltage level is less than an optimum, fully-charged voltage level, as shown at 518.

Where it is determined that the battery voltage level is less than the optimum voltage level, the electronic device 900 may be configurable to cause the charging module 922 to enable charging of the active pen 800 via the charging contact 920, as shown at 524. The electronic device 900 may also be configurable to cause the charging module 922 to adjust the charging mode based on the current battery voltage level, as shown at 526.

Where it is determined that the battery voltage level is not less than the optimum voltage level, the electronic device 900 may be configurable to cause the charging module 922 to disable charging of the active pen 800 via the charging contact 920, as shown at 520. Optionally, the electronic device 900 may be configurable to cause the electronic device 900 to generate a user-output notification at 522 to notify the user that the active pen 800 is fully charged, and optionally that charging of the active pen 800 has been disabled.

Although not explicitly shown, any of the contacts 916, 918 and 920 may be connected to ESD diodes to reduce the risk of electrostatic discharge.

While the proposed technology has been described in terms of active pens for use with touch screens that employ active digitization, the technology may be modified for other battery-powered pen-shaped devices.

What is claimed is:

1. An active pen comprising:
an elongated body member containing therein a signal transmission module and a battery module, the signal transmission module to transmit a signal that is intended for detection by a touch screen that comprises active digitizer technology, and the battery module comprising one or more batteries to power the signal transmission module, the body member comprising a control contact and a charging contact, each positioned on a clip-facing surface of the body member;
an elongated clip member connected to the body member and having a free end comprising a ground contact that is connected to a reference voltage of the active pen, the ground contact positioned on a body-facing surface of the free end opposite the control contact and opposite the charging contact,
wherein the free end is biased toward the clip-facing surface of the body member to maintain the ground contact in electrically conductive contact with the control contact and with the charging contact,
wherein the battery module is to supply full power to the signal transmission module responsive to the ground contact being in electrically conductive contact with the control contact and the charging contact, and
wherein the battery module is to limit the supply of full power to the signal transmission module responsive the ground contact being separated from one or both of the control contact and the charging contact.

2. The active pen as claimed in claim 1, wherein the battery module is to receive a charging voltage from an electronic device via the charging contact.

3. The active pen as claimed in claim 2, further comprising:
a temperature sensor module to produce a temperature-indicating voltage indicative of a temperature of the battery module.

4. The active pen as claimed in claim 3, wherein the active pen is to limit the charging voltage supplied to the battery module via the charging contact responsive to detecting that the temperature-indicating voltage is indicative of a temperature higher than a threshold temperature.

5. The active pen as claimed in claim 3, wherein the active pen is to supply the temperature-indicating voltage to the control contact for detection by the electronic device.

6. The active pen as claimed in claim 3, wherein the active pen is to limit the charging voltage supplied to the battery module via the charging contact responsive to detecting that a voltage of the battery module is higher than a threshold voltage.

7. An electronic device comprising:
a body;
a charging module; and
a partition member having a first surface coincident with an external surface of the electronic device and a second opposing surface coincident with an internal surface of a cavity within the body of the electronic device, the partition member to separate a free end of a clip member of an active pen from a clip-facing surface of a body member of the active pen, and the cavity to receive at least the free end of the clip member, wherein the first surface comprises a control contact and a charging contact to be in electrically conductive contact with a corresponding control contact and charging contact on the clip-facing surface of the body member of the active pen, wherein the second surface comprises a ground contact connected to a reference voltage, the ground contact to be in electrically conductive contact with a corresponding ground contact on a body-facing surface of the free end of the clip member that is biased to maintain contact with the control contact and the charging contact on the clip-facing surface of the body member of the active pen, and wherein the charging module is to supply, via the charging contact of the electronic device, a charging voltage to the active pen for charging a battery module of the active pen.

8. The electronic device as claimed in claim 7, wherein, responsive to detecting a temperature-indicating voltage at the control contact that is indicative of the battery module having a temperature higher than a threshold temperature, the electronic device is to disable the charging module from supplying the charging voltage to the active pen via the charging contact.

9. The electronic device as claimed in claim 7, wherein, responsive to detecting at the charging contact a voltage of the battery module is higher than a threshold voltage, the electronic device is to disable the charging module from supplying the charging voltage to the active pen via the charging contact.

* * * * *